(12) United States Patent
Sankaranarasimhan et al.

(10) Patent No.: US 10,853,470 B2
(45) Date of Patent: Dec. 1, 2020

(54) CONFIGURATION OF APPLICATIONS TO DESIRED APPLICATION STATES

(71) Applicant: Samsung Electronics Co., Ltd., Suwon-si (KR)

(72) Inventors: Manikandan Sankaranarasimhan, Fremont, CA (US); Kalyan Desineni, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 14/585,118

(22) Filed: Dec. 29, 2014

(65) Prior Publication Data

US 2016/0188324 A1    Jun. 30, 2016

(51) Int. Cl.
*G06F 21/44* (2013.01)
*G06F 21/62* (2013.01)
*G06F 9/445* (2018.01)

(52) U.S. Cl.
CPC .......... *G06F 21/44* (2013.01); *G06F 9/44505* (2013.01); *G06F 21/6227* (2013.01)

(58) Field of Classification Search
CPC ... G06F 21/44; G06F 21/6227; G06F 9/44505
See application file for complete search history.

(56) References Cited

U.S. PATENT DOCUMENTS

| 8,140,576 B1 * | 3/2012 | Viripaeff | G06F 17/30525 707/781 |
|---|---|---|---|
| 8,732,661 B2 * | 5/2014 | Brown | G06F 8/38 717/116 |
| 8,756,219 B2 * | 6/2014 | Chand | G06F 17/30637 707/721 |
| 8,954,611 B2 * | 2/2015 | Chan | A63F 13/12 709/203 |
| 9,886,175 B1 * | 2/2018 | Cox | G06F 8/34 |
| 9,965,559 B2 * | 5/2018 | Marcin | G06F 17/30867 |
| 2005/0172126 A1 * | 8/2005 | Lange | G06F 21/53 713/166 |
| 2007/0261048 A1 * | 11/2007 | Bernabeu-Auban | G06F 9/44505 717/170 |
| 2010/0077475 A1 * | 3/2010 | Deschenes | G06F 8/61 726/21 |
| 2012/0129572 A1 * | 5/2012 | Johnstone | G06F 8/67 455/552.1 |
| 2012/0284247 A1 * | 11/2012 | Jiang | G06F 17/30867 707/706 |
| 2012/0311525 A1 * | 12/2012 | Xoual | G06F 21/629 717/104 |

(Continued)

*Primary Examiner* — Jung W Kim
*Assistant Examiner* — Bruce S Ashley
(74) *Attorney, Agent, or Firm* — Jefferson IP Law, LLP

(57) ABSTRACT

Some aspects of the disclosure provide a method comprising receiving, on a digital device, a selection of a first application state of a set of application states of an application, identifying and retrieving path instructions indicating a series of steps to navigate the application to the selected first application state of the set of application states, providing the path instructions to an accessibility module configured to provide accessibility services to a user of the digital device, and navigating, by the accessibility module, the application using the path instructions to configure the application to the selected first application state.

20 Claims, 16 Drawing Sheets

(56) References Cited

U.S. PATENT DOCUMENTS

| | | | |
|---|---|---|---|
| 2012/0316955 A1* | 12/2012 | Panguluri | G06Q 30/02 705/14.41 |
| 2013/0073993 A1* | 3/2013 | Schimpf | G06F 8/38 715/762 |
| 2013/0304729 A1* | 11/2013 | Jiang | G06F 17/30905 707/723 |
| 2014/0068589 A1* | 3/2014 | Barak | G06F 9/445 717/170 |
| 2014/0150023 A1* | 5/2014 | Gudorf | H04N 21/4126 725/38 |
| 2014/0282358 A1* | 9/2014 | Mowatt | G06F 8/70 717/104 |
| 2014/0359598 A1* | 12/2014 | Oliver | G06F 8/61 717/174 |
| 2015/0033219 A1* | 1/2015 | Breiner | G06F 8/61 717/178 |
| 2015/0156061 A1* | 6/2015 | Saxena | G06F 17/30864 715/733 |
| 2016/0006719 A1* | 1/2016 | Khalil | H04L 63/0815 726/8 |

* cited by examiner

```xml
1102  <?xml version="1.0" encoding="UTF-8"?>
      <app pkg="com.eat24.app" name="Eat24" domain="eat24.com">
1104    <deepstate name="Menu"
        id="com.eat24.app_71_SplashActivity_MenuActivity_1">
          <note> Menu items </note>
          <trigger versionName="3.2.3" version="71" platform="Android">
            <description> Menu items </description>
1106        <intent target="com.eat24.app/com.eat24.app.activities.MenuActivity"
            outputscreen="com.eat24.app.activities.MenuActivity.png"
            inputscreen="com.eat24.app.activities.RestaurantInfoAndReviews.png" component="com.eat24.app/
            com.eat24.app.activities.SplashActivity">
              <extra value="0" type="java.lang.Integer"
              tags="type=int,assignedto=EXTRAS_KEY_ACTIVITYROLE "
              key="{EXTRAS_KEY_ACTIVITYROLE}"/>
              <extra value="32041" type="java.lang.Integer"
              tags="type=int,assignedto=EXTRAS_KEY_RESTAURANTID "
              key="{EXTRAS_KEY_RESTAURANTID}"/>
              <extra value=""Bawarchi"" type="java.lang.String"
              tags="type=String,assignedto=EXTRAS_KEY_RESTAURANTNAME "
              key="{EXTRAS_KEY_RESTAURANTNAME}"/>
            - <param name="{EXTRAS_KEY_ACTIVITYROLE}" value="0" type="java.lang.Integer" param-type="extra"
              optional="false" entity="">
                <description> ROLE </description>
              </param>
            - <param name="{EXTRAS_KEY_RESTAURANTID}" value="32041" type="java.lang.Integer" param-
              type="extra" optional="false" entity="">
                <description> Rest Id </description>
              </param>
            - <param name="{EXTRAS_KEY_RESTAURANTNAME}" value=""Bawarchi"" type="java.lang.String"
              param-type="extra" optional="false" entity="">
                <description> Rest name </description>
              </param>
          </intent>
          <result> Menu items </result>
        </trigger>
      </deepstate>
```

CONFIGURATION OF APPLICATIONS TO DESIRED APPLICATION STATES

TECHNICAL FIELD

The present disclosure generally relates to configuration of an application and, more particularly to techniques for configuring an application to invoke an application state.

BACKGROUND

As mobile devices have become more capable and common, there has been increased use of and reliance on mobile applications (i.e., applications on the mobile devices). The number of applications, types of functionality, and amount of content provided by these applications has exploded. Further, new applications as well as updated versions of existing applications with new content are added every day.

Most application developers publish a list of instructions to control or configure their application in different ways. For example, many Android™ applications include or are associated with an application manifest. The manifest includes information that the operating system may require before the application is executed. The manifest may also identify intents that may be used to configure the application to reach desired content from the application. An intent in Android™ is a messaging object that can be used to request an action from another application (or a component of an application).

Unfortunately, as applications have gotten more complex and the information provided by applications has grown, there may be any number of intents and different configurations that are not published by the application developer. The task of identifying intents and different application configurations is often too onerous and burdensome on the application developer. Even if an unpublished intent is discovered, usage of the intent (e.g., by a third-party application) may be limited. For example, while a published intent from a manifest may allow a third-party application to utilize the published intent to configure a different application, the usage of an unpublished intent by the third-party application may result in the generation of a security exception. As a result, discovered, unpublished intents may be of little use.

SUMMARY

Some aspects of the disclosure provide a method comprising receiving, on a digital device, a selection of a first application state of a set of application states of an application, identifying and retrieving path instructions indicating a series of steps to navigate the application to the selected first application state of the set of application states, providing the path instructions to an accessibility module configured to provide accessibility services to a user of the digital device, and navigating, by the accessibility module, the application using the path instructions to configure the application to the selected first application state.

The method may further comprise determining if the selected first application state of the set of application states is externally inaccessible. Determining if the selected first application state of the set of application states is externally inaccessible may include receiving an accessibility indicator that indicates if the selected first application state is externally inaccessible. Further, the method may also comprise determining to provide the path instructions to the accessibility module based on whether the selected first application state is determined to be externally inaccessible.

In some embodiments, the method may further comprise, if the selected first application state of the set of application states is determined to be externally inaccessible, determining if privileges are available to allow configuration of the application to invoke the selected first application state using state access instructions, the state access instructions configured to invoke the second application state of the application without navigating the application. The method may further comprise determining to provide the path instructions to the accessibility module based on the determination that privileges are not available to allow configuration of the application to invoke the selected first application state using state access instructions.

The method may further comprise, in some embodiments, receiving a selection of a second application state of the set of application states of the application, determining if the selected second application state of the set of application states is externally inaccessible, receiving state access instructions configured to invoke the second application state of the application, and configuring the application using the state access instructions to invoke the second application state based on the determination that the selected second application state is not externally inaccessible.

In various embodiments, the method may further comprise receiving a selection of a second application state of the set of application states of the application, determining if the selected second application state of the set of application states is externally inaccessible, determining if privileges are available to allow configuration of the application to invoke the selected second application state using state access instructions, the state access instructions configured to invoke the second application state of the application without navigating the application, receiving state access instructions configured to invoke the second application state of the application, and configuring the application using the state access instructions to invoke the second application state based on the determination that privileges are available to allow configuration of the application to invoke the selected second application state using state access instructions. The method may also further comprise providing credential information to an operating system of the digital device to enable privilege access to allow or assist in allowing configuration of the application to invoke the selected second application state using state access instructions. Selection of the first application state of the set of application states of the application may be selected from search results displayed, at least in part, on the digital device.

An example system may comprise a control module, a path module, and an accessibility module. The control module maybe configured to receive, on a digital device, a selection of a first application state of a set of application states of an application. The path module may be configured to identify and retrieve path instructions indicating a series of steps to navigate the application to the selected first application state of the set of application states. The accessibility module may be configured to provide accessibility services to a user of the digital device and to navigate the application using the path instructions to configure the application to the selected first application state.

An example non-transitory computer readable medium may comprise executable instructions. The instructions may be executable by a data processing device to perform a method. The method may comprise receiving, on a digital device, a selection of a first application state of a set of application states of an application, identifying and retrieving path instructions indicating a series of steps to navigate the application to the selected first application state of the set of application states, providing the path instructions to an accessibility module configured to provide accessibility services to a user of the digital device, and navigating, by the accessibility module, the application using the path instructions to configure the application to the selected first application state.

BRIEF DESCRIPTION OF THE DRAWINGS

FIG. 11 is a portion of a state access instruction report in some embodiments.

Like reference symbols in the various drawings indicate like elements.

DETAILED DESCRIPTION

Figure 1:
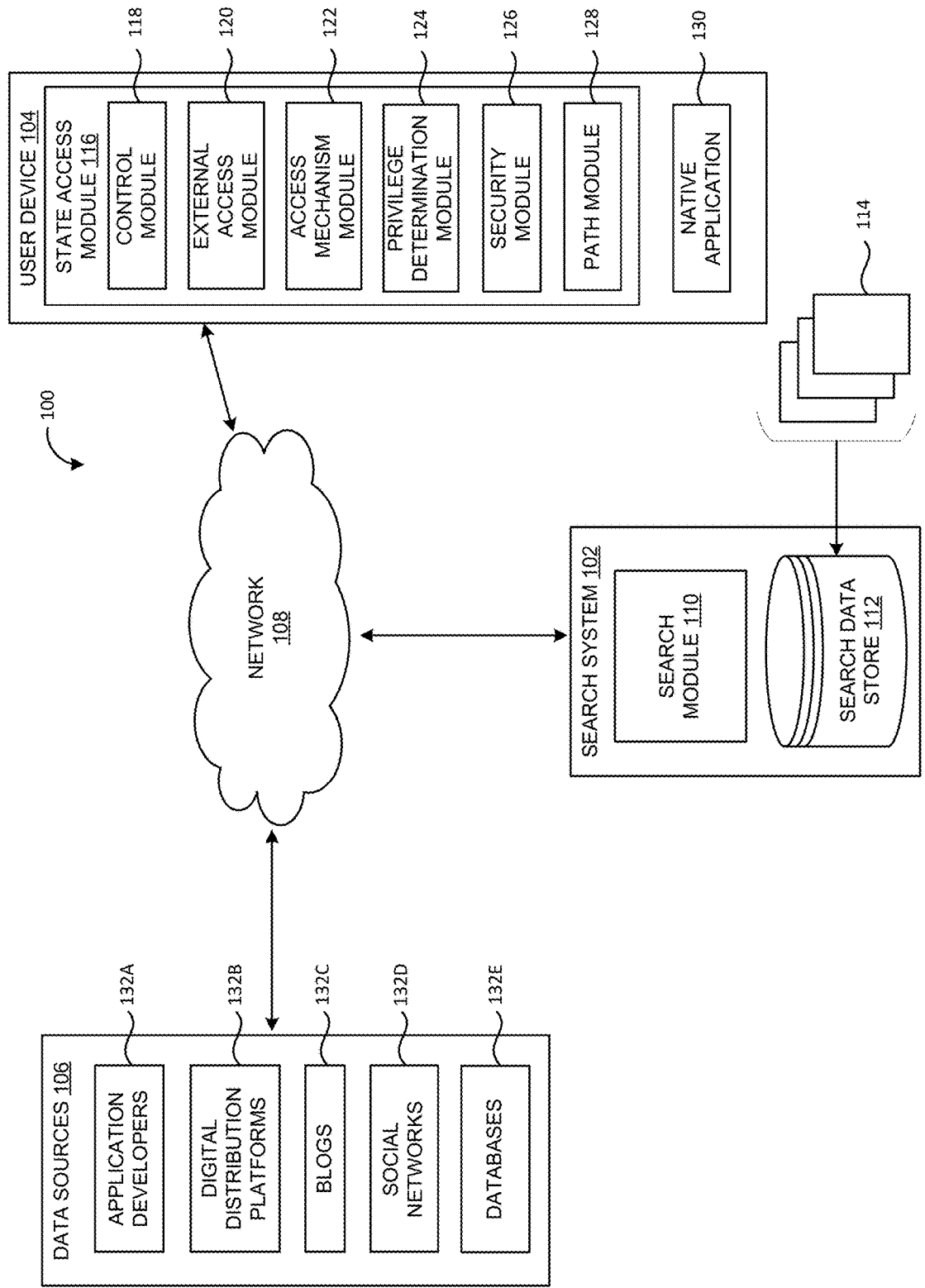
FIG. 1 illustrates an environment including a search system, user device, and data sources in communication over a network in some embodiments

Software applications provide a considerable amount of content. Many applications require a user to navigate (e.g., press desired buttons or tabs) various screens provided by the application to achieve a desired application state where desired content is displayed. For example, a user may execute a review application on a mobile device and enter a type of food (e.g., American) and a zip code. A review application may be an application that enables users to receive reviews for businesses and services, such as restaurants, cleaning services, and the like. Upon entering a type of food and a zip code in a review application, the user may click a button or other icon to transition the review application from its initial screen (e.g., displayed by the review application when the application is in its initial application state) to a screen that displays a list of restaurants at the desired zip code (e.g., displayed by the review application when the application has been configured to a different application state using the entered restaurant type and zip code). Display of content by an application often depends on how the application is controlled, information from the user, and/or information from other applications and/or remote devices.

Some applications publish specific instructions that may be used to configure the application to an application state (e.g., a configuration of the application) to encourage users and/or other applications to configure the application. An application state is a configuration of an application. For example, an application may store data in memory locations. The content of these memory locations, at a given point in the application's execution, is the application's state at that time. In various embodiments, an application may be configured to reach a particular state by a user that executes the application and navigates various interfaces to reach the desired application configuration (i.e., the desired application state). In another example, the application may receive an instruction that calls one or more functions and/or parameters (e.g., the instruction may include or be an Android™ intent) that, when executed by the application, configures the application to an application state. An application may be configured to invoke or achieve an application state in any number of ways.

Many application developers create a publicly available manifest which includes, for example, Android™ intent messages for the application. Each intent message may provide information to enable configuration of the application to one or more different application states. The information from the manifest may be used by users, applications, and/or services to improve accessibility and/or use of the application as well as application content. Not all intents (e.g., instructions to configure an application to an application state), however, are published by the application developer. For example, an application developer may create an application capable of achieving any number of application states. The specific identification of application states, publication of application states, and development of published intents for each application state by the application developer may be onerous and unwieldy.

Some application states may be externally accessible, meaning that an application other than the native application (e.g., the application to be configured to the application state) may use intents (e.g., from the manifest) to invoke the desired application state (e.g., execute and configure the native application to the application state). Alternatively, some application states may be externally inaccessible, meaning that an application other than the native application may not use an intent (e.g., an unpublished intent) or similar instructions to invoke the corresponding application state of the native application. In one example, when an application other than the native application attempts to use an externally inaccessible unpublished intent or similar instruction to configure the native application to the desired application state, an error or exception may be triggered and the process terminated.

An application state may be externally accessible or externally inaccessible based on specifications provided by the developers of the host application. For example, application developers may declare certain intents and/or similar instructions as public, thereby allowing the application states corresponding to the intents and/or instructions to be externally accessible to applications other than the native application. Developers may provide the intents and/or similar instructions that are declared as public to other application developers, for example as an API or listed in a publicly available manifest associated with the native application. Intents and/or similar instructions that are not declared as public may result in their corresponding application states being externally inaccessible.

In various embodiments, application states that are externally inaccessible may still be invoked by applications other than the native application, however, additional steps may be required. For example, the externally inaccessible application state may be invoked through use of a custom background process running on the user device that has been granted system privileges and is thus authorized to use or assist in using the unpublished intents and/or similar instructions to configure the native application and invoke the application state. An application other than the native application may provide the unpublished intents and/or similar instructions to the custom background process, which may then invoke the corresponding application state.

Alternatively, in some embodiments, an externally inaccessible application state may be accessed through use of an accessibility application and/or accessibility service provided by an operating system of a user device. The accessibility application and/or accessibility service may enable application developers to perform specific functions, such as simulate user input on a user device. Typically, the accessibility application and/or accessibility service may enable use of an application to handicapped users who may have difficulty using the user interface components of a user device. In some embodiments, an accessibility application and/or accessibility service may receive and implement a set of path instructions to control an application as well as operations of the application. The path instructions may, for example, identify the application to be controlled as well as user inputs to be performed within the application, such as selecting interactive elements, checking boxes, entering text into forms, or the like, to achieve the desired application state.

Although an accessibility application and/or accessibility service are discussed herein, it will be appreciated that many different applications and/or services may provide similar services and may be used with one or more embodiments discussed herein.

In various embodiments, an application may be configured to produce an output interface when the application is at a particular application state. The output interface is any output that the application may produce at that application state. For example, the output interface may include an html page or card that is displayable to a user of the digital device. The output interface may include functionality and/or content (e.g., maps and navigation, restaurant reviews, podcast information, or the like). Content is any information that provides value to a user. Examples of content may include descriptions, reviews, tutorials, email messages, GPS coordinates, or the like. The application may provide different output interfaces at different application states (e.g., the application may provide different content at different application states).

A software application may refer to computer software that causes a computing device to perform a task. In some examples, a software application may be referred to as an "application," an "app," or a "program." Example applications include, but are not limited to, word processing applications, spreadsheet applications, messaging applications, media streaming applications, social networking applications, and games.

Applications can be executed on a variety of different computing devices. For example, applications can be executed on mobile computing devices such as smart phones, tablets, and wearable computing devices (e.g., headsets and/or watches). Applications can also be executed on other types of computing devices having other form factors such as laptop computers, desktop computers, or other consumer electronic devices. In some examples, applications may be installed on a computing device prior to a user purchasing the computing device. In other examples, the user may download and install applications on the computing device.

The functionality of an application may be accessed on the computing device on which the application is installed. Additionally, or alternatively, the functionality of an application may be accessed via a remote computing device. In some examples, all of an application's functionality is included on the computing device on which the application is installed. These applications may function without communication with other computing devices (e.g., via the Internet). In other examples, an application installed on a computing device may access information from other remote computing devices during operation. For example, a weather application installed on a computing device may access the latest weather information via the Internet and display the accessed weather information to the user through the installed weather application. In still other examples, an application (e.g., a web based application) may be partially executed by the user's computing device and partially executed by a remote computing device. For example, a web application may be an application that is executed, at least in part, by a web server and accessed by a web browser of the user's computing device. Example web applications may include, but are not limited to, web-based email, online auctions, and online retail sites.

Although some embodiments described herein are discussed in conjunction with a search system that may provide state access instructions to a user device, it will be appreciated that a search system, search applications, or the like are not necessary. Various systems and methods described herein may be performed to configure an application to a desired application state regardless of whether there is search system or search results. For example, various systems and methods described herein may be performed to assess whether state access instructions and/or a related application state are externally accessible or externally inaccessible, regardless of the source of the state access instructions (i.e., regardless of whether the state access instructions is provided by or linked to a search system or search results). Similarly, various systems and methods described herein may allow for different techniques to configure the application to the desired application state without regard to a search system or search results.

FIG. 1 illustrates an environment 100 including a search system 102, user device 104, and data sources 106 in communication over a network 108 in some embodiments. The network 108 may be any type of network, including but not limited to a local area network ("LAN"), such as an intranet, a wide area network ("WAN"), such as the Internet, or any combination thereof. Further, the network 108 may be a public network, a private network, or a combination thereof. The network 108 may also be implemented using any number of communications links associated with one or more service providers, including one or more wired communication links, one or more wireless communication links, or any combination thereof. Additionally, the network 108 may be configured to support the transmission of data formatted using any number of protocols.

Multiple computing devices may be connected to network 108. A computing device may be any type of general computing device (e.g., a device with a processor and memory) capable of network communication with other computing devices. For example, a computing device may be a personal computing device such as a desktop or workstation, a business server, or a portable computing device, such as a laptop, smart phone, or a tablet PC. A computing device may include some or all of the features, components, and peripherals of the digital device 1600 of FIG. 16. To facilitate communication with other computing devices, a computing device may also include a communication interface configured to receive a communication, such as a request, data, or the like, from another computing device in network communication and pass the communication along to an appropriate module running on the computing device. The communication interface may also be configured to send a communication to another computing device in network communication with the computing device.

In some embodiments, the search system 102 receives a search query from a user device 104, finds applications or application states (e.g., using information from the search query), and generates search results (e.g., including links to download applications and/or instructions to invoke the application states identified in the search results). The search results may be returned to the requesting user device to enable the requesting user device to invoke the application state corresponding to the search result. For example, the search results may include a state access instruction that the user device 104 may use to invoke the application state, either directly or through use of a custom background process running on the user device that has been granted system privileges. Alternatively, the user device 104 may utilize an accessibility application and/or accessibility service provided by the operating system of the user device 104 to invoke the application state.

A state access instruction is any instruction or set of instructions that may be used to configure or assist in the configuration of a native application 130 to an application state. In various embodiments, the state access instruction may include an application resource identifier and/or one or more operations for a user device to perform. The application resource identifier may be a string having an application specific scheme. The application resource identifier may include a reference to a native application and indicate one or more operations for the application to perform. For example, the application resource identifier may include a reference to the application, a domain name, and a path to be used by the native application to retrieve and display information to the user.

In some examples, the state access instruction may include operations for the native application 130 to perform in addition to the operation(s) indicated in the application resource identifier. In some examples, the operations may be included in a script. Examples of operations may include, but are not limited to, launching the native application 130, waiting for the native application 130 to start, creating and sending a search request to a server, setting a current geo-location in the application, making a restaurant reservation, sending a text message, and adding an appointment to a calendar. A state access instruction may be, for example, an application state access mechanism described herein.

User devices 104 include, but are not limited to, mobile computing devices, such as laptops, tablets, smart phones, and wearable computing devices (e.g., headsets and/or watches). User devices 104 may also include other computing devices having other form factors, such as computing devices included in desktop computers, vehicles, gaming devices, televisions, or other appliances (e.g., networked home automation devices and home appliances). A user device 104 may be any computing device that is capable of providing queries to the search system 102.

The user devices 104 may use a variety of different operating systems. In examples where a user device 104 is a mobile device, the user device 104 may run an operating system including, but not limited to, Android™ developed by Google Inc., iOS® developed by Apple Inc., or WINDOWS PHONE® developed by Microsoft Corporation. Accordingly, the operating system running on the user device 104 may include, but is not limited to, one of Android™, iOS®, or WINDOWS PHONE®. In an example where a user device is a laptop or desktop computing device, the user device may run an operating system including, but not limited to, MICROSOFT WINDOWS® by Microsoft Corporation, MAC OS® by Apple, Inc., or Linux. User devices 104 may also access the search system 102 while running operating systems other than those operating systems described above, whether presently available or developed in the future.

The user device 104 may include a state access module 116 and a native application 130. The native application 130 is any application installed on the user device 104. There may be any number of native applications 130 installed on the user device 104. The state access module 116 may be configured to receive and/or retrieve a state access instruction and/or path instructions to configure the native application 130 to an application state. As discussed herein, state access instructions are instructions that, when executed, configures or assists in configuring an application to a desired application state. For example, the state access instructions may enable configuration of the native application 130 to access content from and/or functionality of the configured native application 130.

As discussed herein, the state access instruction may include a string that includes a reference to an application (e.g., native application 130) installed on a user device 104 (e.g., mobile phone or the like described herein). The string may indicate one or more operations for the user device 104 to perform. In various embodiments, the application to be configured may be launched and the application may perform one or more operations indicated in the state access instruction.

Path instructions may include operations for navigating the native application 130 to a particular application state. The path instructions may include steps that may be performed by or with the native application 130 to reach the desired application states. In one example, the path instructions may mimic a user's operation of the native application 130 to reach the desired application state.

In various embodiments, the path instructions may instruct an application to perform operations on or with another application or service. In one example, a user device may include an accessibility application. The Android™ operating system, like many operating systems, includes an accessibility application and/or provides accessibility services to provide assistance to users with visual, physical, or age related limitations. The accessibility application may, in some embodiments, be configured by and/or use the path instructions to control or otherwise instruct a different application (e.g., the native application 130) to perform operations. In various embodiments, the accessibility application and/or services may utilize the path instructions to control a different application to navigate interfaces, activate interactive elements (e.g., buttons or scroll bars), provide text, and/or the like to configure the application to the desired application state.

When the application is configured to achieve a particular application state using state access instructions or path instructions, the application may display and/or generate an output interface to enable display of content.

The state access module 116 may include a control module 118, an external access module 120, an access mechanism module 122, a privilege determination module 124, a security module 126, and a path module 128. The control module 118 may be configured to receive a request to invoke an application state (e.g., a request to configure the native application 130 to an application state). For example, the control module 118 may be configured to receive a request to invoke an application state of application 130 from another application on the user device 104 (e.g., such as a search application).

The request to invoke an application state may include a state access instruction (e.g., an application state access mechanism as discussed herein), path instructions, and/or any information identifying the native application 130 (i.e., the application to be configured) as well as information regarding the application state to invoke. Although the following example discusses the request to invoke the application state including a state access instruction, it will be appreciated that there may be any number ways to invoke the desired application state (e.g., utilizing path instructions discussed later herein).

In some embodiments, the user device 104 may include a search application configured to receive search results from the search system 102. The search results may provide options to allow a user of the user device 104 to request that an application (e.g., native application 130) be activated and/or configured to a particular application state. When activated, the search application may provide, to the control module 118, a state access instruction, or any information identifying the native application 130, as well as information regarding the application state to invoke.

Upon receiving a request to invoke an application state, the control module 118 may communicate with the other modules of the state access module 116 to initiate invoking the identified application state. For example, the state access module 116 may pass any required data, such as the state access instruction to the other modules.

The external access module 120 may be configured to determine whether a specified application state is externally accessible or externally inaccessible. For example, the external access module 120 may receive the state access instruction. In order to determine if the application resource identifier and/or one or more operations of the state access instruction may be performed by an application external to the application to be configured (e.g., determine whether the application state is externally accessible and/or externally inaccessible), the external access module 120 may be configured to retrieve or receive accessibility information associated with the application state.

In some embodiments, the request to invoke an application state may include an accessibility indicator which may indicate whether the application state is externally accessible and/or externally inaccessible (e.g., whether the application resource identified by the application resource identifier, and/or operations indicated in the state access instruction are externally accessible and/or externally inaccessible). The external access module 120 may retrieve the accessibility indicator from the request to invoke the application state or any source. The external access module 120 may determine if the desired application state is externally accessible or externally inaccessible in many different ways. In some embodiments, the external access module 120 may review a manifest file (discussed herein) on the user device 104 to determine if the desired application state is externally accessible.

In some embodiments, the external access module 120 may provide an accessibility request to another application or digital device. The accessibility request may request whether one or more application states (e.g., including the application state previously requested) is externally accessible or externally inaccessible. The external access module 120 may, for example, provide the accessibility request to another application on the user device 104, a data store on the user device 104, the search system 102, the data source 106, or any digital device. In response, the external access module 120 may receive any number of accessibility indicator(s) indicating whether any number of application state (s) (e.g., any number of application states indicated in the accessibility request) are externally accessible and/or externally inaccessible.

If the external access module 120 determines that the application state indicated in the request to invoke the application state is externally accessible, the access mechanism module 122 may attempt to configure the application 130 utilizing the state access instruction. The state access instruction may, in some embodiments, be provided by a search application on the user device 104 and/or be contained in the request to invoke the application state. Alternately, in some embodiments, the information contained within the request to invoke the application state may indicate where to retrieve the state access instruction (e.g., from another application, database, or digital device). The external access module 120 may retrieve or request the state access instruction and subsequently utilize the state access instruction to configure the native application 130. In some embodiments, the state access module 116 may comprise a data store (not shown in FIG. 1) that includes any number of state access instructions that may be retrieved and/or used by the access mechanism module 122 to configure the application 130.

The access mechanism module 122 may be configured to provide or utilize the state access instructions (e.g., the application state access mechanism described herein) to configure the application to the desired application state. For example, if the external access module 120 determines that the application state is externally accessible, the access mechanism module 122 may configure the application using the state access instructions.

In some embodiments, if the external access module 120 determines that an application state is externally inaccessible, the privilege determination module 124 may be configured to determine whether the state access module 116 may acquire or has adequate privileges to configure the native application 130 using the state access instructions.

In some embodiments, the operating system of the user device 104 may include and/or allow privileges for an application access module (not shown in FIG. 1) and/or privileged services. The application access module may be configured, for example, to allow the state access instructions to be used to configure the native application 130 even though the application state may typically be externally inaccessible. In some embodiments, the application access module and/or privileged services allow all or part of the state access module 116 privileges to configure or assist in configuring the native application 130 to the desired application state using the state access instructions. The application access module 228 may, for example, be a custom background process running on the user device 104 that has been granted system privileges and is thus authorized to use or enable the state access instructions to be used to invoke an application state of the native application 130 that is not externally accessible.

In some embodiments, a third-party may request a mobile device developer to allow installation, configuration, and use of an application access module and/or other services to enable configuration of an application to an application state even if the application state is typically externally inaccessible.

It will be appreciated that the application access module 228 and/or privileged services may allow the state access instructions to be used in any number of ways. In some embodiments, the privileges of all or some of the state access module 116 may be elevated such that all or some of the state access module 116 has sufficient rights and/or privileges to configure the native application 130 using the state access instructions. In various embodiments, the application access module 228 and/or privileged services may configure the native application 130 using the state access instructions.

The privilege determination module 124 may determine whether the user device 104 includes the application access module and/or privileged services. In various embodiments, the privilege determination module 124 queries the operating system or any application to determine if the application access module is installed. In some embodiments, the privilege determination module 124 queries the operating system or any application to determine if the application access module and/or privileged services are active.

If the privilege determination module 124 determines that there are sufficient available rights, the access mechanism module 122 (or the application access module and/or privileged services) may change the configuration of the native application 130 using the state access instructions. For example, the access mechanism module 122 may utilize the application access module and/or privileged services to configure and/or assist in configuring the native application 130 to the application state.

In various embodiments, application access module and/or privileged services may require authentication before allowing configuration of an application to an application state that is normally externally inaccessible. The security module 126 may be configured to communicate with the application access module and/or privileged services to provide any required authorization data. For example, the application access module and/or privileged services may be configured to only grant requests received from specified authorized applications. The application access module and/or privileged services may require specified authorization data, such as an encryption key, digital signature, password, certificate, or the like, that may be authenticated. The security module 126 may be configured to communicate with the application access module and/or privileged services to provide any such authorization data.

In some embodiments, the security module 126 is protected and/or is configured to provide an encrypted key to the application access module and/or privileged services for authentication. The application access module and/or privileged services may decrypt the key or any information to authorize and/or authenticate the security module 126. It will be appreciated that the application access module and/or privileged services may require any kind of security, authentication information, or the like that may be provided by the security module 126.

In some embodiments, the external access module 120 may determine than an application state is externally inaccessible and the privilege determination module 124 determines there are insufficient privileges (e.g., the application access module and/or privileged services on the user device 104 are not present or refuse access). The state access module 116 may configure the native application 130 to the application state using path instructions.

The path module 128 may be configured to retrieve or receive path instructions. In some embodiments, if the external access module 120 determines than an application state is externally inaccessible and the privilege determination module 124 determines there are insufficient privileges, the path module 128 may retrieve and/or utilize path instructions to configure the native application 130.

In some embodiments, the request to invoke the application state may include path instructions and/or state access instructions. The path module 128 may retrieve or otherwise access the path instructions from the request. The path module 128 may retrieve path instructions from any source. In some embodiments, the path module 128 retrieves path instructions for a database, another application, the search system 102 (e.g., the search data store 112), data source 106 and/or the like. The path module 128 may retrieve information from the request to invoke that application state (e.g., information from a state access instruction, a resource identifier, an operation, or any other information) to locate and/or otherwise provide an identifier that identifies the path identifier.

The path module 128 may provide any or all path instructions to an accessibility application and/or service to navigate and/or control configuration of the native application 130 to the desired configuration (e.g., to the desired application state). In some embodiments, the path module 128 may provide instructions from the path instructions slowly to allow time for each command or action to be completed by the accessibility application and/or service.

The accessibility application and/or service may include functionality provided to application developers by the operating system of the user device 104 to enable application developers to perform specific functions, such as simulate user input on the user device 104. For example, the accessibility application and/or service may be utilized by application developers to provide the functionality of their applications to handicapped users.

In some embodiments, functionality of the accessibility application and/or service may be provided as an API to application developers. For example, the accessibility application and/or service may be configured to receive path instructions in a specified format that identify an application to be executed as well as user inputs to be performed within the application, such as selecting interactive elements, checking boxes, entering text into forms, or the like.

In some embodiments, the external access module 120, the privilege determination module 124, and/or the security module 126 are optional. For example, the access mechanism module 122 may attempt to configure the native application 130 utilizing a state access instruction without determining if the application state is externally accessible or externally inaccessible. If the access mechanism module 122 is unsuccessful in configuring the application using the state access instructions (e.g., an error or exception is generated), the access mechanism module 122 may attempt to utilize an application access module and/or privileged services to configure the application without determining if the application access module and/or privileged services are active or present. In some embodiments, if the access mechanism module 122 is unsuccessful after attempting to configuring the application either directly and/or through the application access module and/or privileged services, the path module 128 may retrieve and/or provide path instructions to an accessibility application and/or accessibility services to configure the application.

The state access module 116 may comprise the path module 128. In some embodiments, without initially attempting to configure the application using state access instructions, the path module 128 may retrieve and/or provide path instructions to an accessibility application and/or accessibility services to configure the application. For example, the state access module 116 may not attempt to gather information and/or configure the application using state access instructions. Rather, the path module 128 may retrieve and/or provide path instructions to an accessibility application and/or accessibility services to configure the application without performing many of the functions describe herein.

Data sources 106 may be sources of data which the search system 102 (e.g., the search module 110) may use to generate and update the data store 112. The data retrieved from the data sources 106 may include any type of data related to application functionality and/or application states. Data retrieved from the data sources 106 may be used to create and/or update one or more databases, indices, tables (e.g., an access table), files, or other data structures included in the data store 112. For example, application state records 114 (discussed further herein) may be created and updated based on data retrieved from the data sources 106. In some examples, some data included in a data source 106 may be manually generated by a human operator. Data included in the application state records 114 may be updated over time so that the search system 102 provides up-to-date results.

The data sources 106 may include a variety of different data providers. The data sources 106 may include data from application developers 132a, such as application developers' websites and data feeds provided by developers. The data sources 106 may include operators of digital distribution platforms 132b configured to distribute native applications 226a (FIG. 2) to user devices 104. Example digital distribution platforms 132b include, but are not limited to, the GOOGLE PLAY® digital distribution platform by Google, Inc., the APP STORE® digital distribution platform by Apple, Inc., and WINDOWS PHONE® Store developed by Microsoft Corporation.

The data sources 106 may also include other websites, such as websites that include web logs 132c (i.e., blogs), application review websites or other websites including data related to applications. Additionally, the data sources 106 may include social networking sites 132d, such as "FACEBOOK®" by Facebook, Inc. (e.g., Facebook posts) and "TWITTER®" by Twitter Inc. (e.g., text from tweets). Data sources 106 may also include online databases 132e that include, but are not limited to, data related to movies, television programs, music, and restaurants. Data sources 106 may also include additional types of data sources in addition to the data sources described above. Different data sources 106 may have their own content and update rate.

The search system 102 includes a search module 110 in communication with a search data store 112. The search data store 112 may include one or more databases, indices (e.g., inverted indices), tables, files, or other data structures that may be used to implement the techniques of the present disclosure. The search module 110 receives a query wrapper and generates search results based on the data included in the data store 112. In some implementations, the search module 110 receives a query wrapper from the user device 104 and performs a search for application state records 114 included in the search data store 112 based on data included in the query wrapper, such as a search query. The application state records 114 include one or more access mechanisms (e.g., including state access instructions) that the user device 104 may use to access different functions for a variety of different applications, such as native applications 130 installed on the user device 104. The search module 110 may transmit search results including a list of access mechanisms to the user device 104 that generated the query wrapper.

Modules, engines, and data stores included in the search system 102, the user device 104, and elsewhere in the description, represent features. The modules and data stores described herein may be embodied by electronic hardware (e.g., an Application Specific Integrated Circuit, ASIC), software, firmware, or any combination thereof. Depiction of different features as separate modules and data stores does not necessarily imply whether the modules and data stores are embodied by common or separate electronic hardware or software components. In some implementations, the features associated with the one or more modules and data stores depicted herein may be realized by common electronic hardware and software components. In some implementations, the features associated with the one or more modules and data stores depicted herein may be realized by separate electronic hardware and software components.

The modules and data stores may be embodied by electronic hardware and software components including, but not limited to, one or more processing units, one or more memory components, one or more input/output (I/O) components, and interconnect components. Interconnect components may be configured to provide communication between the one or more processing units, the one or more memory components, and the one or more I/O components. For example, the interconnect components may include one or more buses that are configured to transfer data between electronic components. The interconnect components may also include control circuits (e.g., a memory controller and/or an I/O controller) that are configured to control communication between electronic components.

Figure 2:
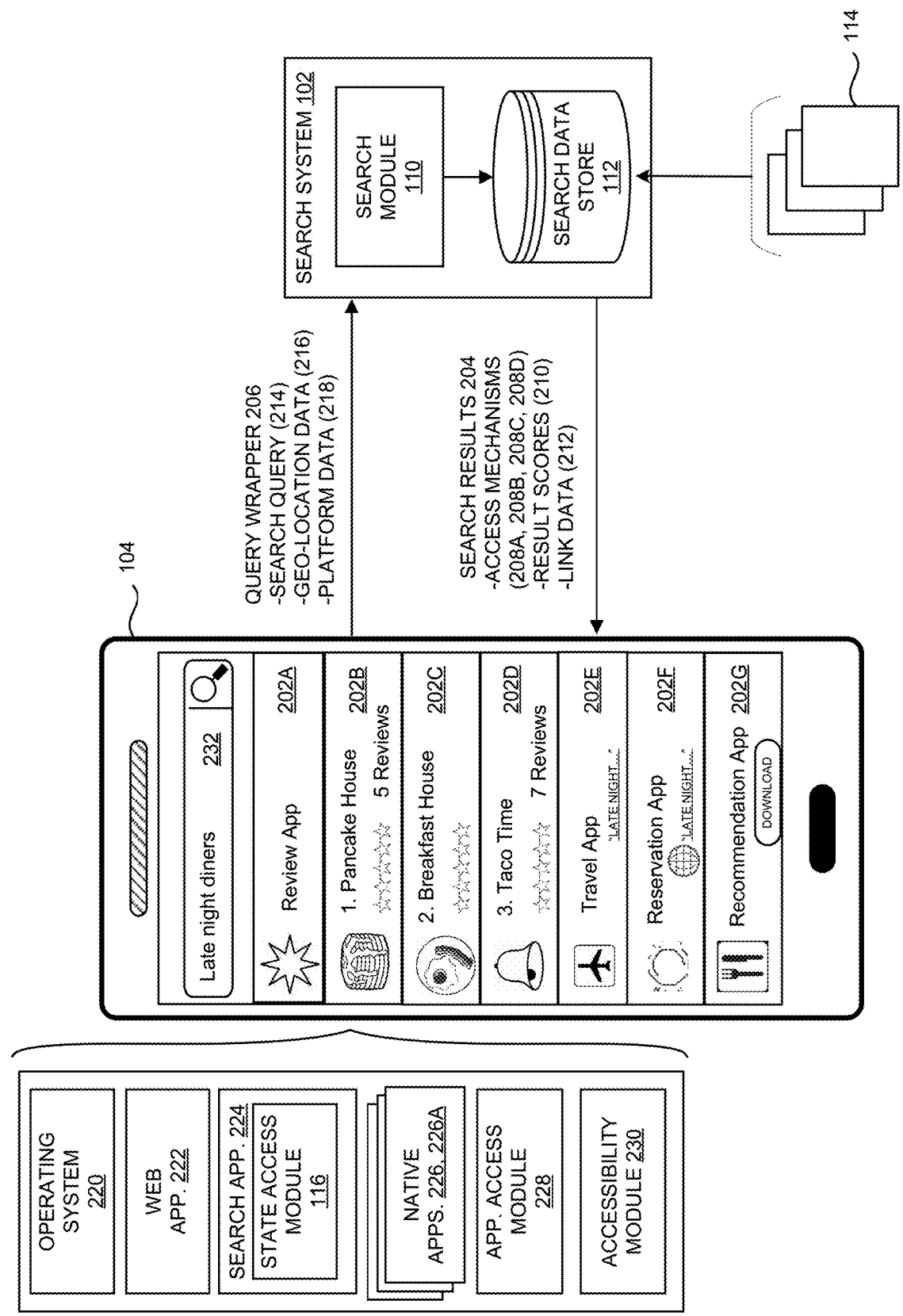
FIG. 2 shows example interaction between the user device and search system in some embodiments.

FIG. 2 shows example interaction between the user device 104 and search system 102 in some embodiments. In various embodiments, the user device 104 generates user selectable links 202a-202g based on the received search results 204. Each user selectable link 202a-202g displayed to the user may include an access mechanism 208a-208d. The user may select any of user selectable links 202a-202g on the user device 104 by interacting with the link (e.g., touching or clicking the link). In response to selection of a link, the user device 104 may launch a corresponding software application 226 (e.g., a native application 226a) referenced by the access mechanism 208a-d and perform one or more operations indicated in the access mechanism.

Access mechanisms may each include at least one of a native application access mechanism 208a (hereinafter "application access mechanism"), a web access mechanism 208b, an application download mechanism 208c, and an application state access mechanism 208d. The user device 104 may use the access mechanisms 208a-d to access functionality of applications 226. For example, the user may select a user selectable link 202a including an access mechanism 208a in order to access functionality of an application 226a indicated in the user selectable link 202a. The search module 110 may transmit one or more application access mechanisms 208a, one or more web access mechanisms 208, and one or more application download mechanisms 208c to the user device 104 in the search results 204.

An application access mechanism 208a may be a string that includes a reference to a native application 226a and indicates one or more operations for the user device 104 to perform. If a user selects a user selectable link 202a including an application access mechanism 208a, the user device 104 may launch the native application 226a referenced in the application access mechanism 208a and perform the one or more operations indicated in the application access mechanism 208a.

A web access mechanism 208b may include a resource identifier that includes a reference to a web resource (e.g., a page of a web application/website). For example, a web access mechanism 208b may include a uniform resource locator (URL) (e.g., a web address) used with hypertext transfer protocol (HTTP). If a user selects a user selectable link 202f including a web access mechanism 208b, the user device 104 may launch the web browser application 222 and retrieve the web resource indicated in the resource identifier. Put another way, if a user selects a user selectable link 202f (e.g., "late night . . . ") including a web access mechanism 208b, the user device 104 may launch a corresponding web browser application 222 and access a state (e.g., a page) of a web application/website. In some examples, web access mechanisms 208b include URLs for mobile-optimized sites and/or full sites.

An application download mechanism 208c may indicate a location (e.g., a digital distribution platform 132b) where a native application 226a may be downloaded in the scenario where the native application 226a is not installed on the user device 104. If a user selects a user selectable link 202g including an application download mechanism 208c, the user device 104 may access a digital distribution platform from which the referenced native application 226a may be downloaded. The user device 104 may access a digital distribution platform 132b using at least one of the web browser application 222 and one of the native applications 226a.

The application state access mechanism 208d may include an application resource identifier and/or one or more operations for a user device 104 to perform. For example, an application resource identifier may be a string having an application specific scheme. The application resource identifier may include a reference to a native application and indicate one or more operations for the user device 104 (e.g., the native application) to perform. For example, the application resource identifier may include a reference to a native application, a domain name, and a path to be used by the native application to retrieve and display information to the user. In some embodiments, the application state access mechanism 208d may be a state access instruction discussed herein.

An example application resource identifier for the reservation native application on the Android™ operating system is "vnd.reservationapplication.deeplink://reservationapplication.com/restaurant/profile?rid=88333 &refid=1." A portion of the example application resource identifier references the reservation native application. For example, the substring "vnd.reservationapplication.deeplink" of the application resource identifier references the reservation native application. The example application resource identifier also indicates one or more operations for the reservation native application to perform. For example, the reservation native application may retrieve and display the information included in the application resource identifier domain and path defined by the substring "reservationapplication.com/restaurant/profile?rid=88333&refid=1." In response to receiving the application resource identifier, the user device 104 may launch the reservation native application and display information retrieved from the location indicated in the application resource identifier. The application resource identifier may be provided by the app developer in some examples.

In some examples, the application state access mechanism 208d may include operations for the user device 104 to perform in addition to the operation(s) indicated in the application resource identifier. For example, the search application 224 on the user device 104, the operating system 220 of the user device 104, and/or a native application 226a installed on the user device 104 may perform the operations included in the application state access mechanism 208d in order to set the native application 226a into an application state specified by the application access mechanism 208d. In some examples, the operations may be included in a script. Examples of operations may include, but are not limited to, launching a native application, waiting for the native application to start, creating and sending a search request to a server, setting a current geo-location in a native application, making a restaurant reservation, sending a text message, and adding an appointment to a calendar.

In some examples, the application state access mechanism 208d may not include an application resource identifier. Instead, the application state access mechanism 208d may include other operations that reference a native application 226a. The operations may be performed by the user device 104. The one or more operations may include instructions for at least one of the search application 224, the operating system 220, and a native application 226a on the user device 104. In response to selection of the application state access mechanism 208d, the user device 104 may perform the operations included in the application state access mechanism 208d. In some examples, the operations may be included in a script.

The application state access mechanism 208d may also include edition information that indicates the application edition with which the application state access mechanism 208d is compatible. For example, the edition information may indicate the operating system with which the application state access mechanism 208d is compatible. In some examples, the search system 102 may determine whether to transmit the application state access mechanism 208d in the search results 204 based on whether the user device 104 (e.g., operating system 220) may handle and/or understand the application state access mechanism 208d.

In some examples, an application resource identifier is an application specific resource identifier that is defined by the developer of the application. In this example, the search application 224 receives the application resource identifier and the operating system 220 may send the application resource identifier to the native application 226a referenced in the application resource identifier. The native application 226a referenced in the application resource identifier launches and is set into the state specified by the application resource identifier.

In some examples, an application function may not be accessible using an application resource identifier. For example, a function of the application may not include a corresponding application resource identifier that the application may use to perform the function. As another example, some applications may not be configured to receive an application resource identifier. In these examples, an application state access mechanism 208d for the native application 226a may include one or more operations that cause the native application 226a to perform the function that may not otherwise be accessible using an application resource identifier. For example, the search application 224 may receive the one or more operations and execute the one or more operations to set the native application 226a into the desired application state. In a specific example, the one or more operations may include launching the native application 226a along with additional operations for the native application 226a to perform. For example, the search application 224 may initially trigger the native application 226a to start and then wait for a period of time for the native application to start. Then the search application 224 may perform additional operations included in the received application access mechanism 208a, such as issuing a search instruction to the native application 226a.

In still other examples, a native application 226a may be configured to directly receive the operations transmitted by the search system 102. In these examples, the native application may be launched according to the application access mechanism and then the launched native application may directly perform the operations received from the search system 102.

A single native application may provide a variety of different functionalities. For example, a restaurant reservation application may access reviews for a variety of different restaurants and set up reservations at a variety of different restaurants. Similarly, a travel application may book hotels, book flights, and provide reviews for different travel destinations. The different functionalities associated with a single native application may be accessed using a plurality of different application access mechanisms. For example, with respect to the restaurant reservation application, the search data store 112 may include application state records having different application access mechanisms for accessing different restaurant reviews and setting up reservations. Similarly, the search data store 112 may include application state records having different application access mechanisms for booking hotels, booking flights, and accessing reviews for different travel destinations.

The application state access mechanisms 208d for a single native application may vary in complexity. In some examples, the application state access mechanisms 208d may cause a native application 226a to launch and then perform additional operations after launching, as described above. In other examples, application state access mechanisms 208d may cause an application 226 to launch into a default state (e.g., a default homepage) without performing any additional operations. An application state record 114 including an application state access mechanism 208d that causes an application 226a to launch into a default state may be thought of as an access mechanism that is related to the native application 226a, but not any particular state which may be accessed by the application 226a. An application state record 114 including such an application state access mechanism 208d may include application state information describing the native application 226a, instead of any particular application state. For example, the application state information may include the name of the developer of the application, the publisher of the application, a category (e.g., genre) of the application, a description of the application (e.g., a developer's description), and the price of the application. The application state information may also include security or privacy data about the application, battery usage of the application, and bandwidth usage of the application. The application state information may also include application statistics. Application statistics may refer to numerical data related to a native application 226a. For example, application statistics may include, but are not limited to, a number of downloads, a download rate (e.g., downloads per month), a number of ratings, and a number of reviews.

The search module 110 may be configured to receive a query wrapper 206 from the user device 104 via the network 108 (see FIG. 1). A query wrapper 206 may include a search query 214, which may include text, numbers, and/or symbols (e.g., punctuation) entered into the user device 104 by the user. For example, the user may enter the search query 214 into a search field 232 (e.g., a search box) of a graphical user interface (GUI) of a search application 224 running on the user device 104. A user may enter a search query 214 using a touchscreen keypad, a mechanical keypad, a speech-to-text program, or other form of user input. In general, a search query 214 may be a request for information retrieval (e.g., search results) from the search system 102. For example, a search query 214 may be directed to retrieving a list of links 202a-g to application functionality or application states in examples where the search system 102 is configured to generate a list of access mechanisms 208a-d as search results 204. A search query 214 directed to retrieving a list of links 202a-g to application functionality may indicate a user's desire to access functionality of one or more applications described by the search query.

In some examples, the search application 224 may be a native application 226a installed on the user device 104. For example, the search application 224 may receive search queries 214, generate the query wrapper 206, and display received data that is included in the search results 204. In additional examples, the user device 104 may execute a web browser application 222 that accesses a web-based search application. In this example, the user may interact with the web-based search application via a web browser application 222 installed on the user device 104. In still more examples, the functionality attributed to the search application 224 may be included as a searching component of a larger application 226 that has additional functionality. For example, the functionality attributed to the search application 224 may be included as part of a native/web application 226a, 222 as a feature that provides search for the native/web application 226a, 222.

The query wrapper 206 may include additional data along with the search query 214. For example, the query wrapper 206 may include geo-location data 216 that indicates the location of the user device 104, such as latitude and longitude coordinates. The user device 104 may include a global positioning system (GPS) receiver that generates the geo-location data 216 transmitted in the query wrapper 206. The query wrapper 206 may also include an IP address, which the search module 110 may use to determine the location of the user device 104. In some examples, the query wrapper 206 may also include additional data, including, but not limited to, platform data 218 (e.g., version of the operating system 220, device type, and web-browser version), an identity of a user of the user device 104 (e.g., a username), partner specific data, and other data.

The search module 110 may use the search query 214 and the additional data included in the query wrapper 206 to generate the search results 204. For example, the search module 110 may determine a geo-location of the user device 104, which the search module 110 may use along with the search query 214 to generate the search results 204. The search module 110 may determine the geo-location of the user device 104 based on the geo-location data or other data (e.g., IP address) included in the query wrapper 206. In some implementations, the search module 110 detects a location (e.g., a postal address, street name, city name, etc.) specified in the search query 214 (i.e., a query-specified location). In these implementations, the search module 110 may use the query-specified location along with the search query 214 to generate the search results 204.

The search module 110 performs a search for application state records 114 included in the search data store 112 in response to the received query wrapper 206 (e.g., in response to the search query 214 and the geo-location data 216). In some implementations, the search module 110 generates result scores 210 for application state records 114 identified during the search. The result score 210 associated with an application state record 114 may indicate the relevance of the application state record 114 to the search query 214. A higher result score 210 may indicate that the application state record 114 is more relevant to the search query 214. The search module 110 may retrieve access mechanisms 208 from the stored application state records 114. The search module 110 may transmit a result score 210 along with an access mechanism 208 retrieved from a stored application state record 114 in order to indicate the rank of the access mechanism 208 among other transmitted access mechanisms 208.

The search module 110 may transmit additional data to the user device 104 along with the access mechanisms 208 and the result score(s) 210. For example, the search module 110 may transmit data (e.g., text and/or images) to be included in the user selectable links 202a-202g ("user selectable links 202"). Data for the user selectable links 202 (e.g., text and/or images) may be referred to herein as "link data." The user device 104 displays the user selectable links 202 to the user based on received link data 202. Each user selectable link 202 may be associated with an access mechanism 208 included in the search results 204, such that when a user selects a link 202, the user device 104 launches the application 226 referenced in the access mechanism 208 and sets the application 226 into the state specified by the access mechanism 208.

The user device 104 may receive a set of search results 204 from the search module 110 in response to transmission of the query wrapper 206 to the search system 102. The GUI of the search application 224 displays (e.g., renders) the search results 204 received from the search module 110. The search application 224 may display the search results 204 to the user in a variety of different ways, depending on what information is transmitted to the user device 104. In examples where the search results 204 include a list of access mechanisms 208 and link data, the search application 224 may display the search results 202 to the user as a list of user selectable links 202 including text and images. The text and images in the links 202 may include application names associated with the access mechanisms 208, text describing the access mechanisms 208, images associated with the application 226 referenced by the access mechanisms 208 (e.g., application icons), and images associated with the application state (e.g., application screen images) defined by the access mechanisms 208.

In some implementations, the search application 224 displays the search results 204 as a list of links 202 arranged under the search field 232 in which the user entered the search query 214. Moreover, the search application 224 may arrange the links 202 in order based on result scores 210 associated with the access mechanisms 208 included in the links 202. In some examples, the search application 224 groups the links 202 together if the links 202 are related to the same application 226.

Each of the links 202 includes link data. For example, each of the links 202 includes an image (e.g., an icon) and text (e.g., an application or business name) that may describe an application and a state of an application (e.g., application state). Each of the links 202 may include an access mechanism so that if a user selects one of links 202, the user device 104 launches the application and sets the application into the application state that is specified by the access mechanism associated with the selected link. In some implementations, the user device 104 may arrange the links 202 based on result scores associated with the access mechanisms included in the links 202. In some implementations, as illustrated in FIG. 2, links 202 for the same application 226 may be combined together in the search results 204 displayed to the user.

With respect to FIG. 2, it may be assumed that the review native application and a travel native application are installed on the user device 104. A travel application may be an application that provides reviews and recommendations regarding travel, such as hotel, car rental, airline, restaurant, or the like. Links 202a-d reference the review native application and link 202e references the travel native application. The GUI includes a header including the name "Review App," under which the links 202b-d are arranged. The header may indicate that the links 202b-d arranged below the header are associated with the review native application 226a. Selection of link 202b may cause the user device 104 to launch the review native application 226a and retrieve a Pancake House restaurant entry of the review native application 226a. Selection of link 202c may cause the user device 104 to launch the review native application 226a and retrieve a Breakfast House restaurant entry of the review native application 226a. Selection of link 202e may cause the user device 104 to launch the travel native application 226a and retrieve an entry for "Late night diners" in the travel native application 226a (e.g., a search for "Late night diners").

Link 202f includes a web access mechanism 208b (e.g., a URL). Selection of link 202f may cause the user device 104 to launch the web browser application 226b and retrieve an entry for "Late night diners" in the reservation web application 226b. Link 202g includes an application download mechanism 208c for the recommendation native application 226a. Selection of link 202g may cause the user device 104 to access a digital distribution platform 116b from which the recommendation native application 226a may be downloaded and/or previewed. The search module 110 may be configured to transmit any combination of application access mechanisms 208a, web access mechanisms 208b, and application download mechanisms 208c in the search results 204.

In some examples, user devices 104 communicate with the search system 102 via a partner computing system (not illustrated). The partner computing system may be a computing system of a third party that may leverage the search functionality of the search system 102. The partner computing system may belong to a company or organization other than that which operates the search system 102. Example third parties which may leverage the functionality of the search system 102 may include, but are not limited to, internet search providers and wireless communications service providers. The user devices 104 may send search queries 214 to the search system 102 and receive search results via the partner computing system. The partner computing system may provide a user interface to the user devices 104 in some examples and/or modify the search experience provided on the user devices 104.

Some application states may be externally accessible, meaning that an application other than the native application 226a (e.g., the application that will be configured to the application state) may use an access mechanism to cause the application state to be invoked by the user device 104 (e.g., execute the native application 226a and configure the native application 226a to the application state). For example, the search application 224 may include a state access module 116 configured to invoke an application state of a native application 226a installed on the user device 104. The state access module 116 may execute an access mechanism corresponding to an externally accessible application state of a native application 226a installed on the user device 104, resulting in the user device 104 executing the native application 226a and configuring the native application 226a to the corresponding application state. In some embodiments, the state access module 116 may execute an access mechanism by providing the access mechanism to the operating system 220 and requesting that the corresponding application state of the native application 226a be invoked.

Alternatively, some application states may be externally inaccessible, meaning that an application other than the native application 226a may not use an access mechanism (e.g., the application state access mechanism 208d) without extra steps to invoke the corresponding application state of the native application 226a. For example, if the state access module 116 attempts to execute an application state access mechanism 208d corresponding to an application state of a native application 226a that is externally inaccessible, an error and/or exception may be generated and/or the request may be denied by the operating system 220.

In some embodiments, application states that are externally inaccessible may still be internally invoked by the host native application 226a through use of an access mechanism. For example, a user may navigate the application 226a to configure the application to the application state, even if the application state is otherwise externally inaccessible. An application state of a native application 226a may be externally accessible or externally inaccessible based on specifications provided by the developers of the native application 226a.

Upon receiving an input (e.g., an application state access mechanism 208d or a selection of an application state access mechanism 208d) to invoke an application state of a native application 226a, the state access module 116 may determine whether the application state is externally accessible or externally inaccessible. In some embodiments, the search system 102 may maintain accessibility indicators indicating whether any number of application states (e.g., state access instructions, operations, or the like) are externally accessible or externally inaccessible. The search system may include any number of accessibility indicators in the search results 204 corresponding to various links (e.g., link 202b) associated with an application state to indicate whether the application state is externally accessible or externally inaccessible. The state access module 116 (e.g., the external access module 120) may then determine from the search results 204 whether the application state is externally accessible or externally inaccessible.

Alternatively, in some embodiments, the state access module 116 may communicate with the search system 102 or any device to determine whether an application state (e.g., state access instructions, operations, or the like) is externally accessible or externally inaccessible. For example, upon receiving a user input to invoke an application state, the state access module 116 may query the search system 102 regarding whether the application state to be invoked is externally accessible and/or externally inaccessible. In response, the search system 102 may return data (e.g., accessibility indicator(s)) to the user device 104 indicating whether the application state is externally accessible and/or externally inaccessible. In some embodiments, the search system 102 maintains any number of accessibility indicators in the search data store 112 and/or the application state records discussed regarding FIGS. 3A and 3B.

The state access module 116 may determine whether an application state is externally accessible and/or externally inaccessible by attempting to invoke the application state using the application state access mechanism 208d. For example, the state access module 116 may provide the application state access mechanism 208d to the operating system 220 on the user device 104 and request that the operating system 220 invoke the corresponding application state. If the operating system 220 returns an error and the process is terminated, the state access module 116 may determine that the application state is externally inaccessible. Alternatively, if the operating system 220 does not return an error, the state access module 116 may determine that the application state is externally accessible and the application state may be invoked. If the state access module 116 determines that an application state is externally accessible, the state access module 116 may invoke the application state using the access mechanism 208d, if it has not already been invoked.

It will be appreciated that the state access module 116 may generate indicators of whether an application state (e.g., and/or the corresponding state access instruction) is externally accessible and/or externally inaccessible depending on whether configuration of the native applicant 226a is successful (e.g., the state access module 116 may log successful outcomes and failures). For example, the state access module 116 may generate an accessibility indicator associated with the application to be configured and/or the application state (e.g., the accessibility indicator being associated with, but not limited to, the application state access mechanism 208d and/or operations to be performed by the application). The state access module 116 may internally store the accessibility indicators and/or provide the accessibility indicators to any device or application (e.g., the search system 102).

In some embodiments, the state access module 116 may still invoke an application state even if the application state is not externally accessible, although not through direct use of the application state access mechanism 208d. In some embodiments, the user device 104 may include an application access module 228 configured to use an access mechanism 208d to invoke an application state that is externally inaccessible. The application access module 228 may be a custom background process running on the user device 104 that has been granted system privileges. The application access module 228 may, in some embodiments, use an application state access mechanism 208d to invoke an application state that is externally inaccessible. The state access module 116 may provide the application state access mechanism 208d to the application access module 228, which may then configure the native application 226a to invoke the corresponding application state.

In some embodiments, the application access module 228 may require that an application attempting to invoke an application state through the application access module 228 be an authorized application or otherwise authenticated. For example, the application access module 228 may require that a requesting application provide authorization data, such as a key, digital signature, or the like, to authorize the application to utilize the application access module 228 to invoke an externally inaccessible application state. A security module of the state access module 116 may provide credentials or other information to allow use of the application access module 228 and/or any privileged processes to enable configuration of the native application 226a. Alternatively, the application access module 228 may maintain a list of authorized applications and search the list to determine whether a requesting application is authorized.

In some embodiments, a user device 104 may not include an application access module 228. In these instances, an externally inaccessible application state may not be invoked using an access mechanism. Rather, in various embodiments, the state access module 116 may utilize an accessibility module 230 on the user device 104 to invoke the externally inaccessible application state. The accessibility module 230 (e.g., an accessibility application and/or accessibility service) may include functionality provided to application developers by the operating system 220 to enable application developers to perform specific functions, such as simulate user input on the user device 104. For example, as discussed herein, the accessibility module 230 may be utilized by application developers to provide the functionality of their applications to handicapped users that may have difficulty using the user interface components of the user device 104. The accessibility module 230 may be configured to receive path instructions in a specified format that identify an application to be executed as well as user inputs to be performed within the application, such as selecting interactive elements, checking boxes, entering text into forms, or the like.

The state access module 116 may communicate with the accessibility module 230 and provide the accessibility module 230 with the appropriate path instructions to invoke an externally inaccessible application state. For example, if the user device 104 does not include the application access module 228, the state access module 116 may access the path instructions and pass the path instructions to the accessibility module 230 to invoke the externally inaccessible application state. In some embodiments, the path instructions may be provided by the search system 102 along with the search results 204 and the state access module 116 may access the provided path instructions and pass them to the accessibility module 230. Alternatively, the state access module 116 may query the search system 102 for the path instructions and, in response, the search system 102 may provide the path instructions to the state access module 116. The state access module 116 may then pass the path instructions to the accessibility module 230 to invoke the externally inaccessible application state.

The accessibility module 230 and/or the state access module 116 may utilize the path instructions to navigate the native application 226a to reach the desired application state. In various embodiments, the process of navigating the native application 226a to the application state may be indistinguishable to the native application 226a when compared to manual navigation.

Figure 3B:
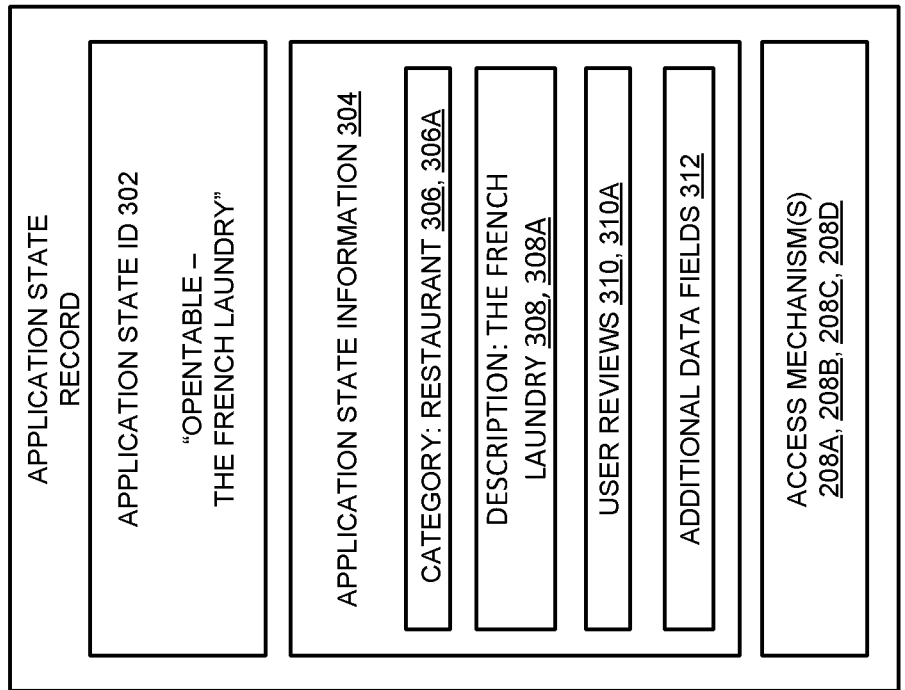
FIGS. 3A and 3B depict example application state records in some embodiments.
Figure 3A:
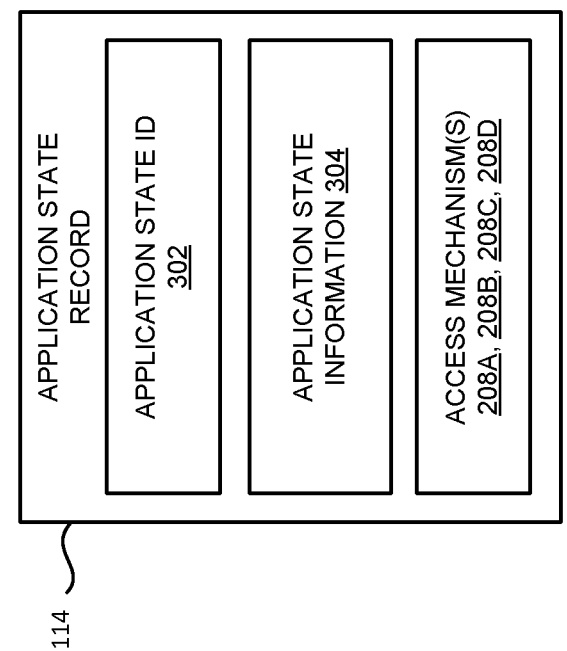

FIGS. 3A and 3B depict example application state records in some embodiments. In various embodiments, the search data store 112 may include a plurality of different application state records 114. Each application state record 114 may include data related to a state of the application 226. An application state record 114 may include an application state identifier (ID) 302, application state information 304, and one or more access mechanisms 208a-d used to access functionality provided by an application 226.

The application state ID 302 may be used to identify the application state record 114 among the other application state records 114 included in the search data store 112. The application state ID 302 may be a string of alphabetic, numeric, and/or symbolic characters (e.g., punctuation marks) that uniquely identifies the associated application state record 114. In some examples, the application state ID 302 describes a function and/or an application state in human readable form. For example, the application state ID 302 may include the name of the application 226 referenced in the access mechanism(s) 208. Additionally or alternatively, the application state ID 302 may be a human readable string that describes a function performed according to the access mechanism(s) 208 and/or an application state resulting from performance of the function according to the access mechanism(s) 208. In some examples, the application state ID 302 includes a string in the format of a uniform resource locator (URL) of a web access mechanism 208b for the application state record 114, which may uniquely identify the application state record 114.

In a more specific example, if the application state record 114 is for a state of the review native application, the application state ID 302 may include the name "Review Application" along with a description of the application state described in the application state information 306. For example, the application state ID 302 for an application state record 114 that describes the restaurant named "The French Laundry" may be "Review Application—The French Laundry." In an example where the application state ID 302 includes a string in the format of a URL, the application state ID 302 may include the following string "http://www.reviewapplication.com/biz/the-french-laundry-yountville-2?ob=1" to uniquely identify the application state record 114. In additional examples, the application state ID 302 may include a URL using a namespace other than "http://," such as "func://."

The application state information 304 may include data that describes an application state into which an application 226 is set according to the access mechanism(s) 208 in the application state record 114. Additionally or alternatively, the application state information 304 may include data that describes the function performed according to the access mechanism(s) 208 included in the application state record 114. The application state information 304 may include a variety of different types of data, such as structured, semi-structured, and/or unstructured data. The application state information 304 may be automatically and/or manually generated based on documents retrieved from the data sources 106. Moreover, the application state information 304 may be updated so that up-to-date search results 204 may be provided in response to a search query 214.

In some examples, the application state information 304 includes data that may be presented to the user by an application 226 when the application 226 is set in the application state defined by the access mechanism(s) 208. For example, if one of the access mechanism(s) 208 is an application access mechanism 208d, the application state information 304 may include data that describes a state of the native application 226a after the user device 104 has performed the one or more operations indicated in the application access mechanism 208d. For example, if the application state record 114 is associated with a shopping application, the application state information 304 may include data that describes products (e.g., names and prices) that are shown when the shopping application is set to the application state defined by the access mechanism(s) 208. As another example, if the application state record 114 is associated with a music player application, the application state information 304 may include data that describes a song (e.g., name and artist) that is played when the music player application is set to the application state defined by the access mechanism(s) 208.

The types of data included in the application state information 304 may depend on the type of information associated with the application state and the functionality defined by the access mechanism(s) 208. For example, if the application state record 114 is for an application 226 that provides reviews of restaurants, the application state information 304 may include information (e.g., text and numbers) related to a restaurant, such as a category of the restaurant, reviews of the restaurant, and a menu for the restaurant. In this example, the access mechanism(s) 208 may cause the application 226 (e.g., a native application 226a or a web application 222) to launch and retrieve information for the restaurant. As another example, if the application state record 114 is for an application 226 that plays music, the application state information 304 may include information related to a song, such as the name of the song, the artist, lyrics, and listener reviews. In this example, the access mechanism(s) 208 may cause the application 226 to launch and play the song described in the application state information 304.

FIG. 3B shows an example application state record 114 associated with the reservation application. The reservation application is a restaurant-reservation application that may allow users to search for restaurants and make restaurant reservations. The reservation application provides information about restaurants including descriptions of restaurants and user reviews of the restaurants. The example application state record 114 of FIG. 3B describes an application state of the reservation application in which the reservation application accesses information for THE FRENCH LAUNDRY® restaurant.

The example application state record 114 includes an application state ID 302 of "reservation—THE FRENCH LAUNDRY," which may be used as a unique identifier to identify the application state record 114. In other examples, the application state ID 302 could include a URL as a unique identifier for the application state record 114. For example, the application state ID 302 may include the string "http://www.reservation application.com/the-french-laundry" as a unique identifier for the application state record 114. As described herein, such an application state ID may be included in a web access mechanism 208b of an application state record 114. As another example, the application state ID 302 may have a different namespace than "http://," such as "func://." In yet another example, the application state ID 302 could be a string of characters, numbers, and/or symbols that are not in human readable form. Each example is optional and may be combined with other examples.

The example application state information 304 includes data fields such as a category 306a of THE FRENCH LAUNDRY® restaurant, a description 308a of THE FRENCH LAUNDRY® restaurant, user reviews 310a of THE FRENCH LAUNDRY® restaurant, and additional data fields 312. The restaurant category 306 field may include the text "French cuisine" and "contemporary," for example. The description field 308 may include text that describes THE FRENCH LAUNDRY® restaurant. The user reviews field 310 may include text of user reviews for THE FRENCH LAUNDRY® restaurant. The additional data fields 312 may include additional data for THE FRENCH LAUNDRY® restaurant that may not specifically fit within the other defined fields, such as a menu for the restaurant, prices, and operating hours for the restaurant.

The application state record 114 includes one or more access mechanism(s) 208. The access mechanism(s) 208 may include a reference to the reservation application 226. An example application access mechanism 208a for the application state record 114 may include a reference to the reservation native application 226a along with one or more operations to be performed by the user device 104. For example, the application access mechanism 208a may include an application resource identifier and/or one or more operations that cause the user device 104 to access the entry for THE FRENCH LAUNDRY® restaurant in the reservation native application. An example application resource identifier may be "vnd.

reservationapplication.deeplink://
reservationapplication.com/restaurant/profile?rid=1180&refid=1."

The application state records 114 may include any information including, but not limited to application state access mechanisms (e.g., state access instructions), path identifiers, accessibility indicators, and/or the like.

Figure 4:
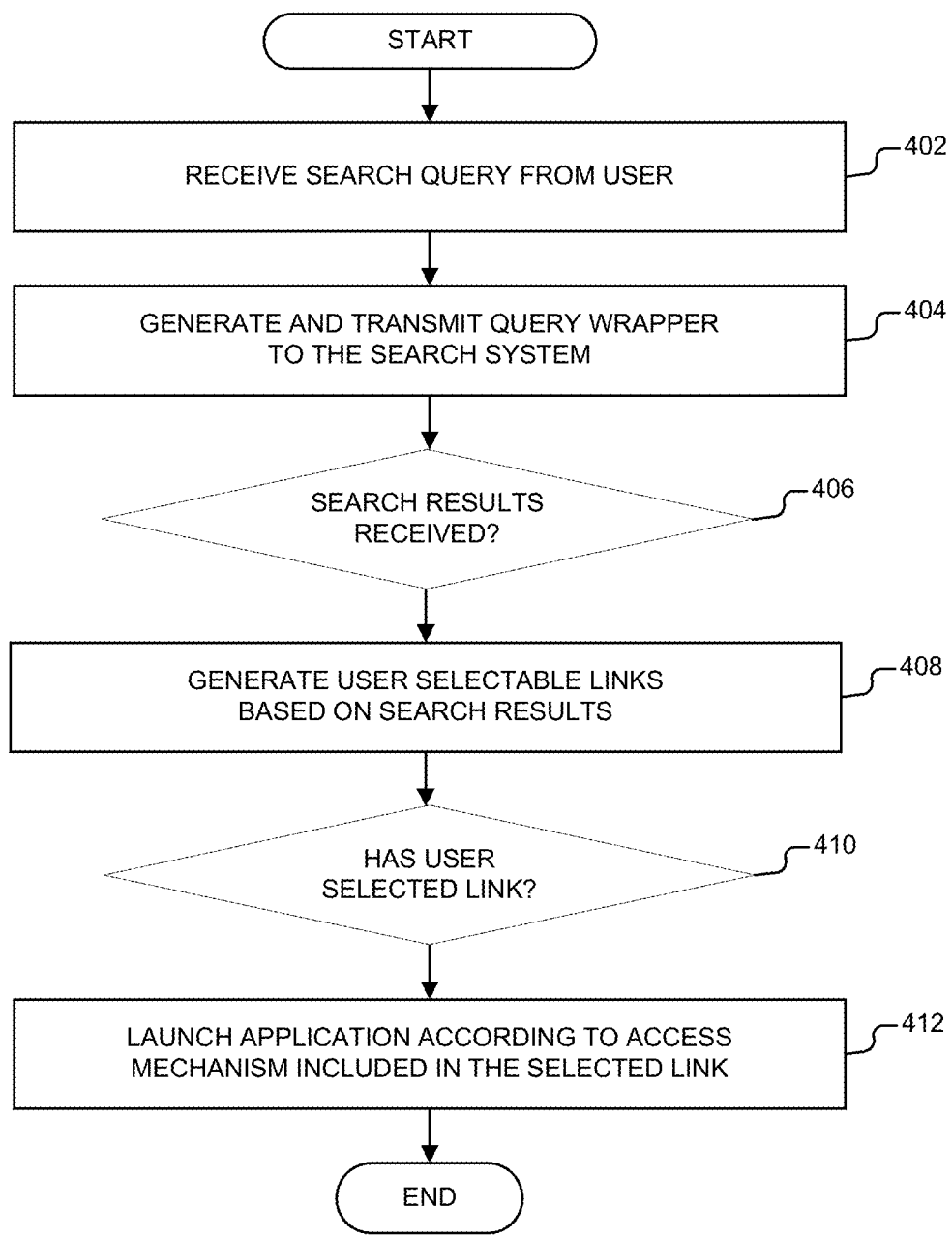
FIG. 4 provides an example arrangement of operations for a method of operating a user device in some embodiments.

FIG. 4 provides an example arrangement of operations for a method 400 of operating a user device 104 in some embodiments. It may be assumed that the user device 104 described according to the method 400 includes a search application 224 (e.g., a native application 226a or web browser application 222) configured to communicate with the search system 102.

In step 402, the method 400 includes receiving a search query 214 (see FIG. 2) from a user. In some implementations, the search application 224 executing on the user device 104 receives the search query 214 from of the user.

In step 404, the method includes generating and transmitting query wrapper 206 to the search system 102. In some implementations, the user device 104 generates and transmits the query wrapper 206 to the search system 102.

In step 406, the method 400 includes waiting for receipt of the search results 204. For example, the user device 104 waits for receipt of the search results 204 from the search system 102. The method 400 continues to step 408 when the user device 104 receives the search results 204 from the search system 102. The search results 204 may include a list of access mechanisms 208 and optionally result scores 210 associated with the access mechanisms 208. Additionally, the search results 204 may optionally include link data (e.g., text and/or images) for the access mechanisms 208. The search application 224 may generate user selectable links 202 in the GUI based on the received link data 202.

In step 408, the method 400 includes generating user selectable links 202 based on the search results 204. The search application 224 may generate the user selectable links 202. In step 410, the method includes waiting for a user selection of a link 202. The search application 224 may wait for the user to select one of the user selectable links 202 before operation proceeds to step 412. When the user selects (e.g., touches) one of the links 202, the method 400 includes launching an application 226 associated with the link 202. For example, in response to selection of a link 202 including an access mechanism 208, the user device 104 launches the application 226 referenced in the access mechanism 208 and performs one or more operations indicated in the access mechanism 208 in step 412.

Figure 5:
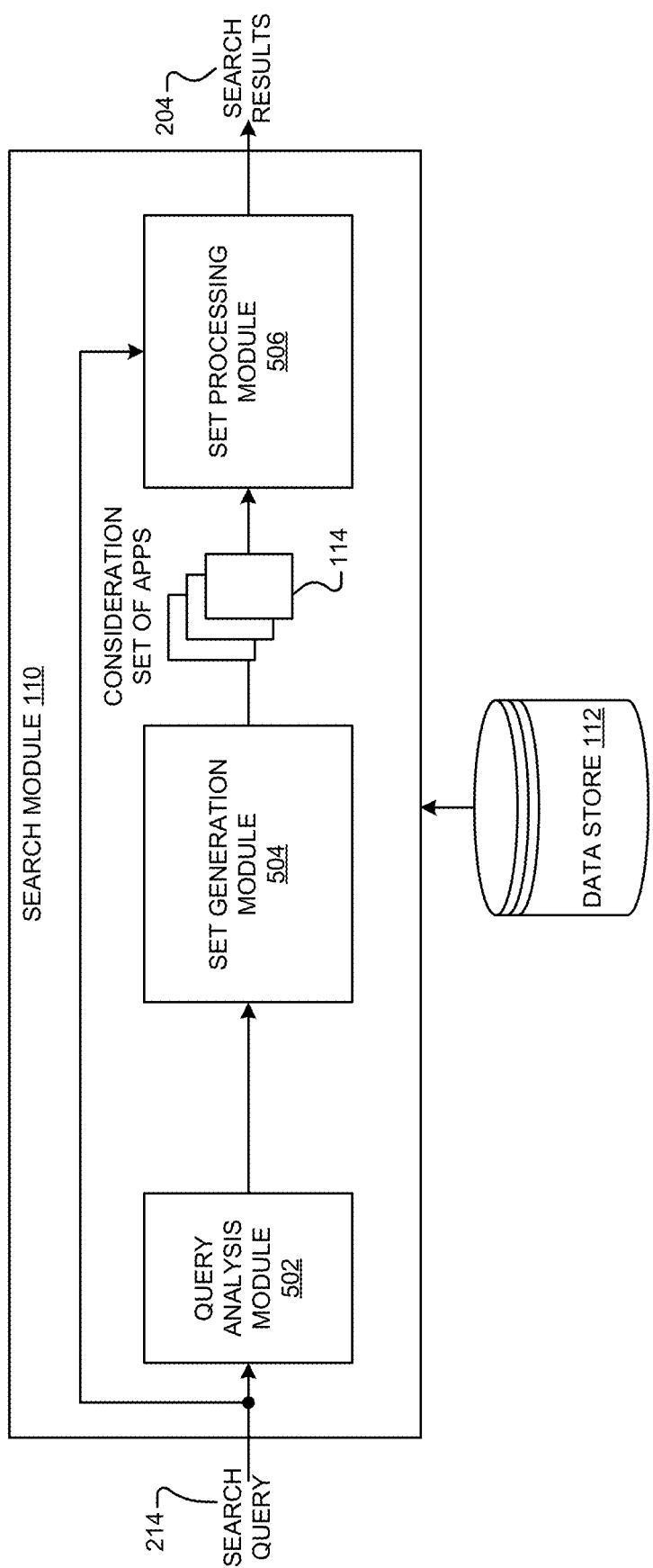
FIG. 5 depicts a search module in some embodiments.

FIG. 5 depicts a search module 110 in some embodiments. The search query 214 received by the search module 110 is used to perform a search of the data store 112. The query analysis module 502 receives the search query 214. The query analysis module 502 may perform various analysis operations on the received search query 214. For example, analysis operations performed by the query analysis module 502 may include, but are not limited to, tokenization of the search query, filtering of the search query, stemming, synonymization, and stop word removal.

The set generation module 504 identifies a set of application state records (i.e., the consideration set) based on the search query 214. In some examples, the set generation module 504 may identify the set of application state records based on matches between terms of the search query 214 and terms in the application state records. For example, the set generation module 504 may identify a set of application state records in the data store 112 based on matches between tokens generated by the query analysis module 502 and words included in the application state records, such as words included in the application state information and/or application state IDs.

The set processing module 506 processes the consideration set to generate a set of search results 204 that includes a list of application access mechanisms. In some examples, the set processing module 506 scores the functions records included in the consideration set. The scores associated with the application state records may be referred to as "result scores." Accordingly, in some examples, each of the application state records in the consideration set may have a corresponding result score. The set processing module 506 may then select application state records from the consideration set based on the result scores associated with the application state records. For example, the set processing module 506 may select the highest scoring application state records of the consideration set.

The set processing module 506 selects application access mechanisms from the selected application state records (e.g., the highest scoring application state records). The set processing module 506 transmits the selected application access mechanisms to the user device 104 that generated the search query 214. The set processing module 506 may also transmit the result scores associated with the selected application access mechanisms. For example, an application access mechanism may be associated with the result score of the application state record from which the application access mechanism was selected.

The information conveyed by the search results 204 may depend on how the result scores are calculated by the set processing module 506. For example, the result scores may indicate the relevance of an application function or application state to the search query 214, the popularity of an application function or state, or other properties of the application function or state, depending on what parameters the set processing module 506 uses to score the application state records.

The set processing module 506 may generate result scores for application state records in a variety of different ways. In some implementations, the set processing module 506 generates a result score for an application state record based on one or more scoring features. The scoring features may be associated with the application state record and/or the search query 214. An application state record scoring feature (hereinafter "record scoring feature") may be based on any data associated with an application state record. For example, record scoring features may be based on any data included in the application state information of the application state record. Example record scoring features may be a quality score, whether the application state record includes an application access mechanism that leads to a default state or a deeper native application state, and, for newly generated application state records, the number of application state records used to generate the newly generated application state record, as described hereinafter. A query scoring feature may include any data associated with the search query 214. For example, query scoring features may include, but are not limited to, a number of words in the search query 214, the popularity of the search query 214, and the expected frequency of the words in the search query 214. A record-query scoring feature may include any data that may be generated based on data associated with both the application state record and the search query 214 that resulted in identification of the application state record by the set generation module 506. For example, record-query scoring features may include, but are not limited to, parameters that indicate how well the terms of the search query 214 match the terms of the application state information of the identified application state record. The set processing module 506 may generate a result score for application state record based on at least one of the record scoring features, the query scoring features, and the record-query scoring features.

The set processing module 506 may determine a result score based on one or more of the scoring features listed herein and/or additional scoring features not explicitly listed. In some examples, the set processing module 506 may include one or more machine learned models (e.g., a supervised learning model) configured to receive one or more scoring features. The one or more machine learned models may generate result scores based on at least one of the record scoring features, the query scoring features, and the record-query scoring features. For example, the set processing module 506 may pair the search query 214 with each application state record and calculate a vector of features for each (query, record) pair. The vector of features may include one or more record scoring features, one or more query scoring features, and one or more record-query scoring features. The set processing module 506 may then input the vector of features into a machine-learned regression model to calculate a result score for the application state record. In some examples, the machine-learned regression model may include a set of decision trees (e.g., gradient boosted decision trees). In another example, the machine-learned regression model may include a logistic probability formula. In some examples, the machine learned task may be framed as a semi-supervised learning task, where a minority of the training data is labeled with human curated scores and the rest are used without human labels.

The result scores 210 associated with the application state records 114 (e.g., access mechanisms 208) may be used in a variety of different ways. The set processing module 506 and/or the user device 104 may rank the access mechanisms 208 based on the result scores 210 associated with the access mechanisms 208. In these examples, a larger result score may indicate that the access mechanism 208 (e.g., the function or application state) is more relevant to a user than an access mechanism 208 having a smaller result score. In examples where the user device 104 displays the search results 204 as a list, the user device 104 may display the links 202 for access mechanisms 208 having larger result scores 210 nearer to the top of the results list (e.g., near to the top of the screen). In these examples, the user device 104 may display the links 202 for access mechanisms 208 having lower result scores 210 farther down the list (e.g., off screen).

Figure 6:
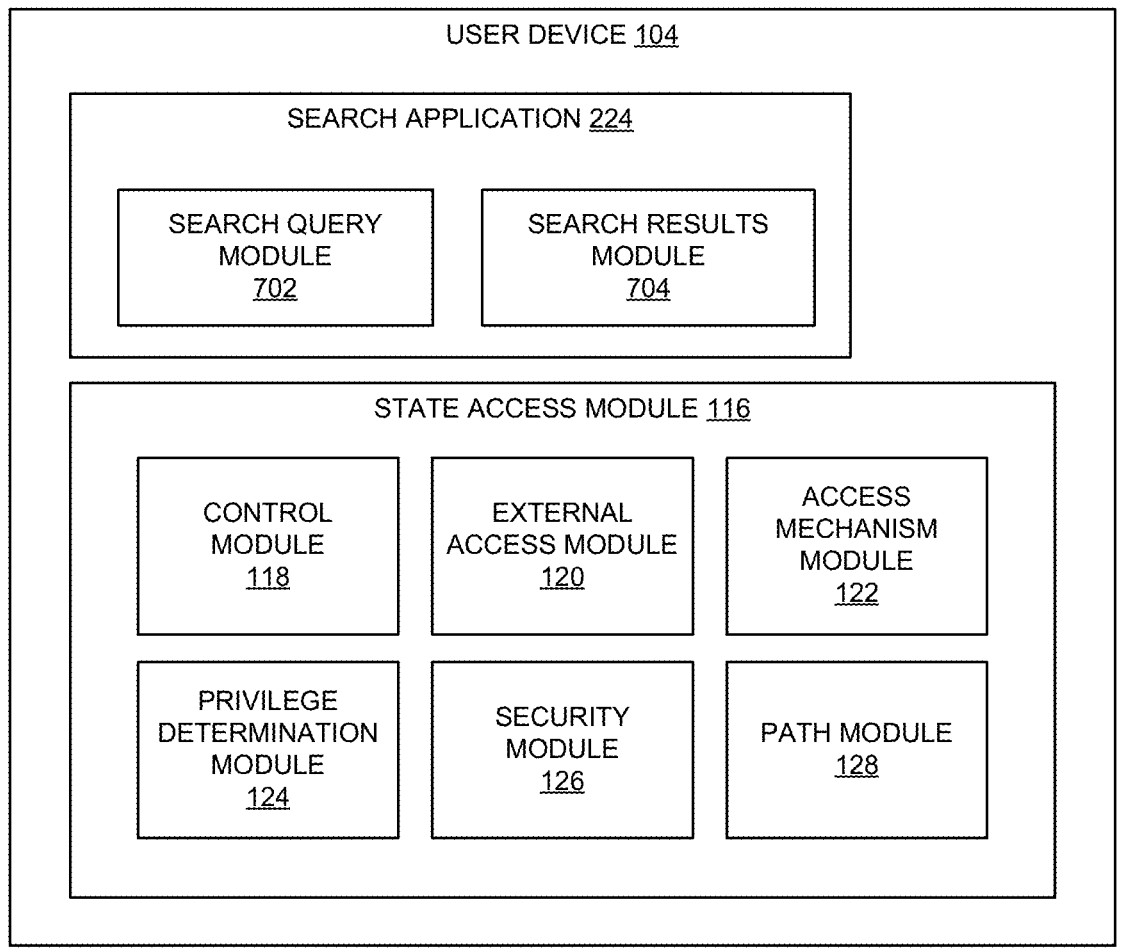
FIG. 6 shows an example state access module that may be used with a search application on a user device in some embodiments

FIG. 6 shows an example state access module 116 that may be used with a search application 224 on a user device 104 in some embodiments. As shown, the search application may include a search query module 702 and a search results module 704. The search query module 702 may present a user with a search interface that enables a user to enter and submit a search query. Upon receiving a search query from a user, the search query module 702 may transmit the search query to the search system 102.

The search results module 704 may receive search results 204 from the search system 102 and present the search result 204 to a user of the user device 104 (e.g., see FIG. 2). Search results may allow the user to select any number of specified application states of a native application 226a installed on a user device 104. For example, the search results may include user selectable links 202 that, when selected, cause the user device 104 to invoke the application state corresponding to the search result 204. For example, the search results may include an application state access mechanism 208d to configure an application to an application state.

For example, upon receiving a user selection of a user selectable link 202 requesting to invoke an application state corresponding to one of the search results 204, the search results module 704 may transmit a request to the state access module 116 to invoke the application state. The request may include data identifying the application as well as the application state to invoke. The request may be received by the control module 118, which may then communicate with the other modules of the state access module 116 to invoke the identified application state. For example, the external access module 120 may determine whether the application state is externally accessible or externally inaccessible.

In some embodiments, the search results 204 may include data indicating whether their corresponding application states are externally accessible or inaccessible and the external access module 120 may analyze the search results to make the determination. For example, the search result 204 for each application state may be flagged (e.g., associated with an accessibility indicator) to indicate whether the corresponding application state is externally accessible or externally inaccessible. The search results 204 may be flagged by the search system 102 prior to transmitting the search results 204 to the user device 104.

The state access module 116 may include a control module 118, an external access module 120, an access mechanism module 122, a privilege determination module 124, a security module 126 and a path module 128. The control module 118 may be configured to receive a request to invoke an application state (e.g., from the search application 224). For example, the control module 118 may be configured to receive a request to invoke an application state from an application on a user device 104, such as a search application 224, a native application 226, or the like.

The request to invoke an application state may include data identifying the host application as well as application state to invoke. Upon receiving a request to invoke an application state, the control module 118 may communicate with the other modules of the state access module 116 to initiate invoking the identified application state. For example, the state access module 116 may pass any required data, such as data identifying the host application and the application state to the other modules.

The external access module 120 may be configured to determine whether a specified application state is externally accessible and/or externally inaccessible. For example, the external access module 120 may query the search system 102 and/or the search application 224 regarding whether an application state is externally accessible or externally inaccessible. In response to the search query, the search system 102 may transmit data indicating whether the application state is externally accessible and/or externally inaccessible. The search application 224 may, in some embodiments, provide any number of accessibility indicators that indicate whether an application state is externally accessible or externally inaccessible (e.g., with the request to invoke the application state).

In some embodiments, the external access module 120 may query a data source (e.g., either an external data source like data source 106 or local information on the user device 104) to determine whether an application state is externally accessible and/or externally inaccessible. A data source may include a host application, provided database, manifest file, or the like.

In some embodiments, the external access module 120 may determine whether an application state is externally accessible and/or externally inaccessible based on a declaration document, such as a manifest, associated with the application. For example, application developers may provide a declaration document that lists application state access mechanisms 208d for the application that have been declared as public, resulting in their corresponding application states being externally accessible. The external access module 120 may determine whether an application state access mechanism 208d for the application state is listed in the declaration document to determine whether the corresponding application state is externally accessible.

If the external access module 120 determines that an application state is externally accessible, the access mechanism module 122 may invoke the application state directly using the appropriate access mechanism (e.g., the application state access mechanism 208d provided by the search application 224 and/or the search system 102). Alternatively, if the external access module 120 determines that an application state is externally inaccessible, the state access module 116 may invoke the application state using an alternate method, such as utilizing an application access module 228 or accessibility module 230 on the user device 104.

The access mechanism module 122 may be configured to utilize an application state access mechanism 208d to invoke the corresponding application state. For example, upon a determination by the external access module 120 that an application state is externally accessible, the access mechanism module 122 may communicate with the operating system 220 of the user device 104 (or directly to the application to be configured) to request that the application state be invoked using the application state access mechanism 208d. For example, the access mechanism module 122 may transmit the application state access mechanism 208d to the operating system 220 and/or the native application 226a to be configured and request that the application state be invoked.

The privilege determination module 124 may determine whether the state access module 116 may acquire or has access to adequate privileges to configure the native application 226a to an application state using an application state access mechanism 208d (even though the application state may normally be externally inaccessible). If the privilege determination module 124 determines that the state access module 116 may acquire, has access to, or may obtain access to privileges, the state access module 116 may obtain privileged access and/or utilize the application state access mechanism 208d to configure the native application 226a to the desired application state. The state access module 116 may include a security module 126 configured to communicate with the application access module 228 to provide required authorization data to the application access module 228.

In some embodiments, the state access module 116 may include a security module 126 configured to communicate with the application access module 228 to provide any authorization data to the application access module 228. For example, the application access module 228 may be configured to only grant requests received from specified authorized applications. The application access module 228 may require specified authorization data, such as a key, digital signature, or the like, that may be authenticated by the application access module 228. The security module 126 may be configured to communicate with the application access module 228 to provide such authorization data.

If the privilege determination module 124 determines that the state access module 116 may not acquire adequate privileges (e.g., because the user device 104 does not include the application access module 228 or the security module 126 was unable to establish authentication and/or authorization), the state access module 116 may invoke the application state using an accessibility module 230 provided by the user device 104. The state access module 116 may include a path module 128 configured to communicate with the accessibility module 230 to invoke an application state. For example, if the privilege determination module 124 determines that the search application 224 may not acquire adequate privileges to access an externally inaccessible application state, the path module 128 may retrieve and/or utilize path instructions. In some embodiments, the path module 128 may provide the path instructions to the accessibility module 230 to configure the application to the desired application state.

The accessibility module 230 may include functionality provided to application developers by the operating system 220 of the user device 104 to enable application developers to perform specific functions, such as simulate user input on the user device. In some embodiments, functionality of the accessibility module 230 may be provided as an API to application developers. For example, the accessibility module 230 may be configured to receive path instructions in a specified format that identify an application to be executed as well as user inputs to be performed within the application.

In some embodiments, the path instructions may be provided by the search system 102 along with the search results 204 and the path module 128 may access the provided path instructions and pass all or part of them to the accessibility module 230. In some embodiments, the path module 128 may control the accessibility module 230 to configure the application 226a using the path instructions. In various embodiments, the path module 128 may query the search system 102 for the path instructions and, in response, the search system 102 may provide the path instructions to the search application 224. The path module 128 may retrieve path instructions from any digital device, application, or data storage.

Figure 7:
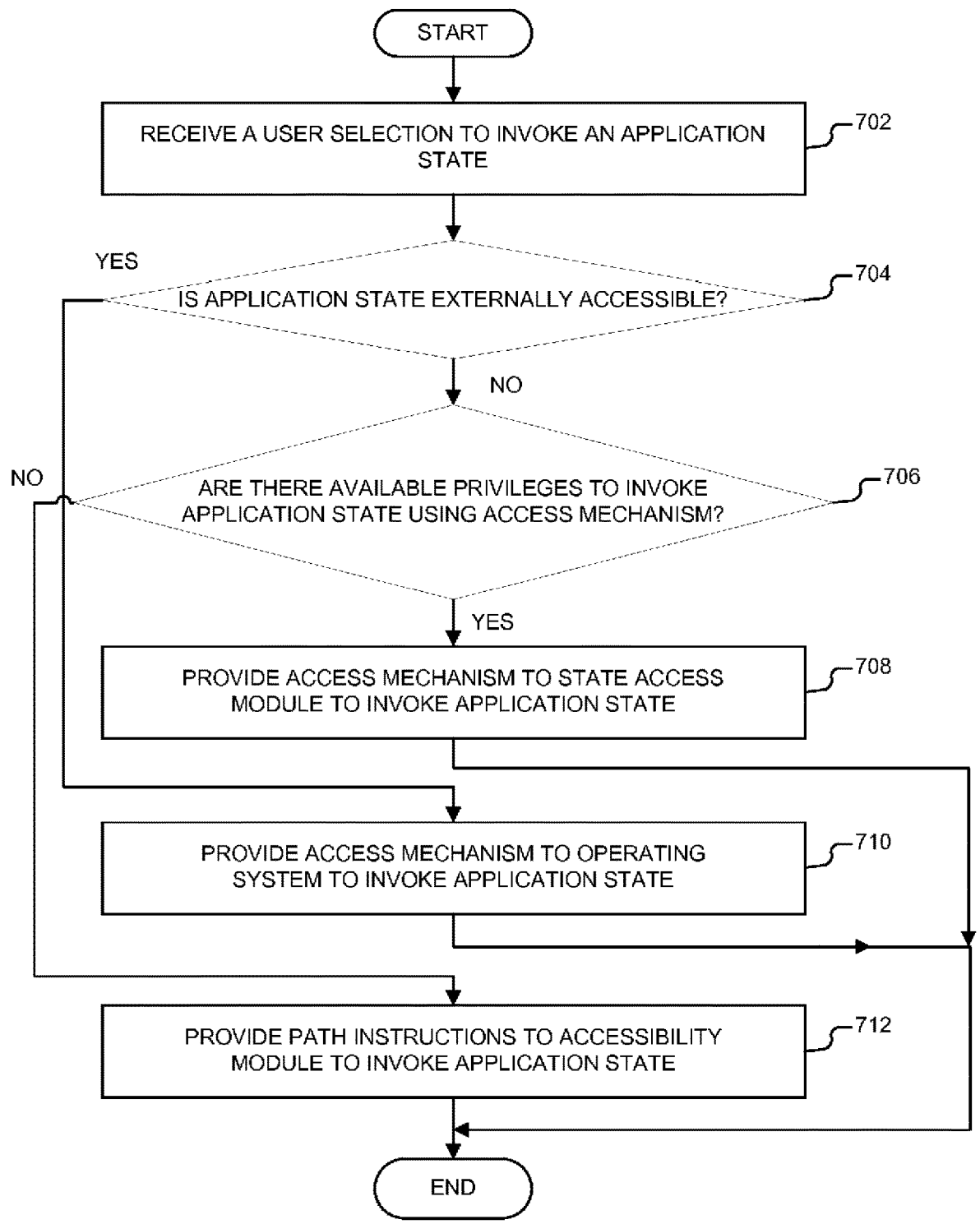
FIG. 7 is a flowchart of configuring an application to an application state by a state access module on a user device in some embodiments.

FIG. 7 is a flowchart of configuring an application to an application state by a state access module 116 on a user device 104 in some embodiments. In step 702, a control module 118 of the state access module 116 receives a request to invoke an application state. For example, the request may be received from a search application 224 as a result of a user selecting a user selectable link 202 provided along with a search result 204. The request to invoke an application state may include or be a state access instruction (e.g., application state access mechanism 208*d*), a request identifying a state access instruction, or the like. The request may be received from any application (e.g., native application on the user device 104), digital device, or the like.

In step 704, the external access module 120 determines whether the application state is externally accessible and/or externally inaccessible. For example, a search system 102 may provide data (e.g., an accessibility indicator) indicating whether an application state is externally accessible along with a search result 204 corresponding the application state. The external access module 120 may determine from the data included in the search results whether the application state is externally accessible. Alternatively, the external access module 120 may query the search system 102 to determine whether the application state is externally accessible.

If the external access module 120 determines that the application state is externally accessible, the method may continue to step 710 where the access mechanism module 122 may provide a state access instruction to the operating system 220 to configure the application to the application state. For example, the access mechanism module 122 may gather the state access instruction corresponding to the application state from the search results 204 or by querying the search system 102. The access mechanism module 122 may then utilize the state access instructions to configure or assist in configuring the native application 226a to invoke the application state.

If in step 704, the external access module 120 determines that the application state is not externally accessible (e.g., the application state is externally inaccessible), the method may continue to step 706 where the privilege determination module 124 may determine whether there are available privileges to invoke the application state using the state access instruction. For example, the user device 104 may include an application access module 228 configured to use a state access instruction to invoke an application state that is externally inaccessible. The application access module 228 may be a custom background process running on the user device 104 that has been granted system privileges and is thus authorized to use a state access instruction to invoke an application state that is externally inaccessible.

The privilege determination module 124 may determine whether the user device 104 includes an application access module 228 to determine whether there are available privileges to invoke the application state using the state access instruction. If the privilege determination module 124 determines that there are available privileges to invoke the application state using the state access instruction (e.g., the user device 104 includes an application access module 228) the method may continue to step 708 where the access mechanism module 122 may provide the state access instruction to the application access module 228 to invoke the application state.

Alternatively, if the privilege determination module 124 determines that there are not available privileges to invoke the application state using the state access instruction (e.g., the user device 104 does not include an application access module 228) the method may continue to step 712 where the path module 128 may provide path instructions to an accessibility module 230 to invoke the application state. The accessibility module 230 may include functionality provided to application developers by the operating system 220 to enable application developers to perform specific functions, such as simulate user input on the user device 104.

The path module 128 may communicate with the accessibility module 230 and provide the accessibility module 230 with the appropriate path instructions to invoke the application state. For example, the path instructions may be provided to the user device 104 by the search system 102 along with the search results 204 and the path module 128 may access the provided path instructions and pass them to the accessibility module 230. Alternatively, the path module 128 may query the search system 102 for the path instructions and, in response, the search system 102 may provide the path instructions to the path module 128. The path module 128 may then pass the path instructions to the accessibility module 230 to invoke the application state.

Techniques are also described for discovery of application states in an application. In various embodiments, the code of the application may be pre-processed and inspected to identify components of the code (e.g., objects) and usage that are linked to configuring the application to a different application state. In some embodiments, the application may be executed and the application configured (e.g., through the application graphical user interface or GUI). Commands to components and usage may be hooked or intercepted to identify code components and usage.

Once a component of the code and/or usage is identified, functional instructions (e.g., state access instructions and/or path instructions) may be created or generated to configure or assist in configuration of the application to the identified application state. In some examples, the functional instructions may be used to direct users to desired content, to improve interoperability with other applications and services, display content, and/or provide improved access to content.

Figure 8:
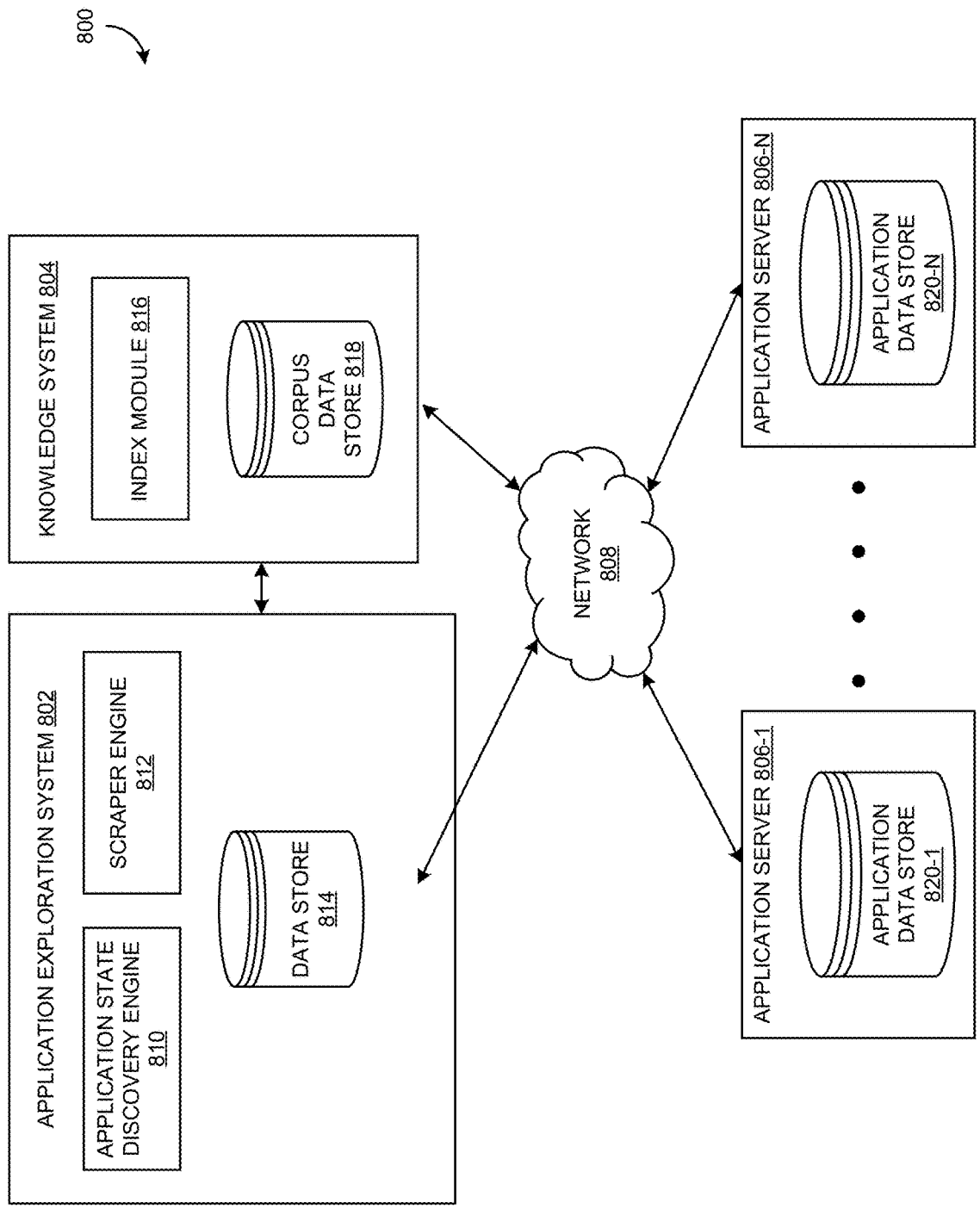
FIG. 8 is an illustration of an environment including an application exploration system, a knowledge system, and application servers each in communication over a network in some embodiments.

FIG. 8 is an illustration of an environment 800 including an application exploration system 802, a knowledge system 804, and application servers 806-1 . . . 806-N each in communication over a network 808 in some embodiments. The network 808 may be similar to network 108 in FIG. 1. The network 808 may include various types of networks, such as a local area network (LAN), a wide area network (WAN), and/or the Internet. The application exploration system 802, knowledge system 804, and application servers 806-1 . . . 806-N may be computing devices.

The application exploration system 802 includes an application state discovery engine 810, a scraper engine 812, and a data store 814. In various embodiments, the application state discovery engine 810 is configured to discover any number of application states (e.g., possible configurations) of an application. Any number of the discovered application states may be associated with an output interface of the application. The output interface may include content that may be of value to a user, another application, service, or the like.

In some embodiments, once the application state discovery engine 810 discovers a desired application state (e.g., a configuration of an application), the application state discovery engine 810 may generate instructions (e.g., state access instructions and/or path instructions) that, when executed, configures or assists in configuring the application to the desired application state. In one example, when the application is configured to achieve a particular application state using state access instructions, the application may display and/or generate an output interface to enable display of content.

The state access instruction may enable configuration of an application to access content from of functionality of the configured application. In some embodiments, a state access instruction may include a string that includes a reference to an application installed on a user's device (e.g., mobile phone or the like described herein). The string may indicate one or more operations for the user device to perform. In various embodiments, the application may be launched and the application may perform one or more operations indicated in the state access instruction.

State access instructions may include an application resource identifier and any associated parameter values (if any). In some embodiments, the state access instructions may include template function instructions. The application resource identifier may include, for example, instructions that identify or refer to a component of an application to perform an activity or service. Parameter values are any values that may be passed to the component of the application. In one example, an application resource identifier may identify or call a component within the review application that ultimately displays restaurants. The state access instructions may include a parameter value including a zip code for New York City. In this example, the state access instruction calls a component within the review application to perform a function utilizing the provided parameter function in order to configure review to display a list of restaurants in New York City.

In some embodiments, state access instructions include a template function instruction that includes an application resource identifier as well as one or more parameter variables. A parameter variable is any indicator or reference to a parameter value.

The data store 814 may be any memory configured to store, for example, state access instructions, template function instructions of state access instructions, application resource identifiers, parameter variables, and/or parameter values. The corpus data store 818 may also store content and/or UI elements.

The application exploration system 802 may further include a scraper engine 812. In various embodiments, the scraper engine 812 may be configured to gather content from any number of applications. In some embodiments, an application may be configured to a specific application state using a state access instruction discovered by the application state discovery engine. The scraper engine 812 may subsequently copy content from an output interface generated by the application at that application state. The scraper engine 812 may copy any content including, but not limited to, text, images, audio, video, or the like.

In some embodiments, the scraper engine 812 may also scrape user interface (UI) elements from the output interface. UI elements are those elements used in an interface (e.g., a graphical user interface or GUI) that represent information indicated in that interface. UI elements may indicate content (e.g., text, image, audio, video, animation, or any media either locally stored or retrievable over a network). In one example when the output interface is coded in xml, a UI element may indicate content by defining TextView as android:text="Restaurant review for ALEXANDER'S STEAKHOUSE is five stars." In various embodiments, the UI element may include a link to another application, data store, and/or a remote digital device to retrieve content to be shared with the user UI elements may indicate and/or describe functionality (e.g., buttons, scroll bars, tabs, or the like). For example, UI elements for a particular output interface may indicate a window for content and a scroll bar associated with that window which may change the content of the window when actuated (e.g., when the window scrolls as a result of activation of the scroll bar).

In various embodiments, the scraper engine 812 may scrape an output interface depending on the UI element(s). For example, the scraper engine 812 may identify a UI element and perform functions based on the type of UI element. In some embodiments, each UI element may be associated with any number of scraper instructions. The scraper engine 812 may scrape content associated with a UI element based on the scraper instructions. Since not all UI elements may be associated with content, there may be scraper instructions that instruct the scraper engine 812 to take no action or to scan for a different UI element.

The knowledge system 804 may include index module 816 and corpus data store 818. The knowledge system 804 may be configured to store state access instructions from the application state discovery engine 810, content and/or UI elements copied from the scraper engine 812 or the like. For example, the index module 816 may index and/or categorize information identified by the application exploration system 802. In some embodiments, the index module 816 indexes state access instructions, template function instructions of state access instructions, application resource identifiers, parameter variables, and/or parameter values. The index module 816 may index and/or categorize information identified by the scraper engine 812 including content and/or UI elements. In various embodiments, the index module 816 may index, categorize, or otherwise associate information from the scraper engine 812 with information from the application state discovery engine 810. In some embodiments, the index module 816 may index, categorize, or otherwise associate state access instructions, template function instructions of state access instructions, application resource identifiers, parameter variables, and/or parameter values with each other.

The corpus data store 818 may be any memory configured to store, for example, state access instructions, template function instructions of state access instructions, application resource identifiers, parameter variables, and/or parameter values. The corpus data store 818 may also store content and/or UI elements.

The application servers 806-1 . . . 106-*n* are any digital devices that may include application data store 820-1 . . . 820-*n*, respectively. In various embodiments, the application servers 806-1 . . . 106-*n* may provide information to an application. For example, the review application may retrieve information from the application data store 820-1 to display to a user. In another example, if the review application is configured (e.g., using a state access instruction) to a particular application state, the review application may generate an output interface and display information from the application server 806-1 in the output interface.

Figure 9:
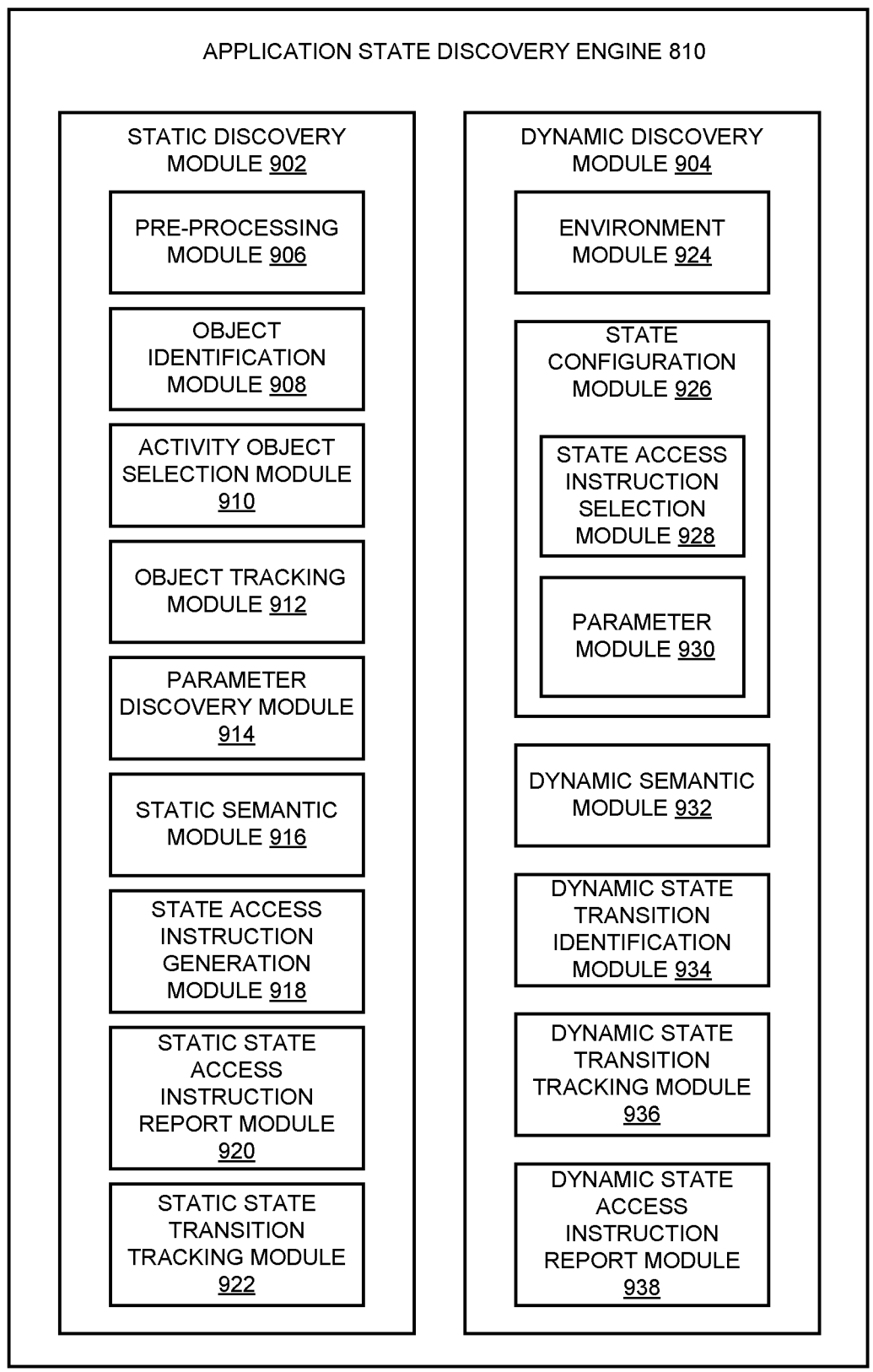
FIG. 9 is an illustration of an example application state discovery engine in some embodiments.

FIG. 9 is an illustration of an example application state discovery engine 810 in some embodiments. The application state discovery engine 810 may comprise a static discovery module 902 and a dynamic discovery module 904. In various embodiments, the static discovery module 902 may discover application states of an application by inspecting all or some code of the application. For example, an application developer may provide source code or any other code which may be inspected and/or scanned for information indicative of an application state or application state change.

In another example, the static discovery module 902 may decompile and/or perform other pre-processing of an application to generate a reviewable code which may be subsequently inspected and/or scanned. The following are examples of application state discovery in reviewable code. It will be appreciated that the following examples and embodiments discussed herein is not limited to pre-processed (e.g., reviewable) code but may be any code including, for example, code that has not been decompiled and/or otherwise pre-processed (e.g., code provided by the application developer or otherwise obtained elsewhere).

In some embodiments, the static discovery module 902 may identify classes from the pre-processed code and scan functions related to the classes to identify either creation or passage of an activity object (e.g., an intent object). The activity object may be created by the pre-processed code or received from another source (e.g., operating system, another application, and/or another device). The static discovery module 902 may track variables associated with the activity objects including, for example, how they are assigned or used. A variable may reference a stored value. The static discovery module 902 may identify parameter variables from the tracked variables. A parameter variable is a variable that is utilized by the activity function to configure the application into another (or desired) state. The static discovery module 902 may generate a state access instruction based on the identified activity object and related parameter variable(s) (if any).

The static discovery module 902 may comprise a pre-processing module 906, an object identification module 908, an activity object selection module 910, an object tracking module 912, a parameter discovery module 914, a static semantic module 916, a state access instruction generation module 918, a static state access instruction report module 920, and a static state transition tracking module 922.

The pre-processing module 906 may be configured to pre-process an application code to a reviewable code. The reviewable code may be in any language. In some embodiments, the pre-processing module 906 decompiles and/or performs other pre-processing of the application code to generate a reviewable code that is machine readable. The reviewable code may be human readable and/or machine readable. For example, the reviewable code may be coded in the java programming language and/or XML. The pre-processing module 906 may be or include any decompiler, translator, parser, and/or the like.

In some embodiments, the pre-processing module 906 may decompress, extract, and/or separate code. For example, the pre-processing module 906 may disassemble and extract components from an Android™ application package (APK). The APK is a package file format used to distribute and install application software onto a digital device with an Android™ operating system. To make an APK file, an application for Android™ is first compiled and then its parts are packaged into the file. The APK may contain all of the program's code (such as .dex files), resources, assets, and the manifest file. An APK file is a type of archive file.

The pre-processing module 906 may decompress some or all of an application. For example, the pre-processing module 906 may decompress some or all of an APK file (e.g., decompress the APK file). The pre-processing module 906 may extract the desired program's code (e.g., extract the .dex files from the decompressed APK package).

In various embodiments, the pre-processing module 906 decompiles the program's decompressed and/or extracted code into the reviewable format. The pre-processing module 906 may further parse the code for further analysis. For example, the pre-processing module 906 may segment and/or otherwise separate the code to enable scanning or pattern matching (e.g., to identify desired activity objects).

The object identification module 908 and/or the activity object selection module 910 may identify activity objects and/or candidate activity objects from the reviewable code. An activity object is an object identified in the reviewable code that is used to change the application state (e.g., reconfigure) the application. In various embodiments, an activity object is an object that reconfigures the application to an application state that enables access to or display of content. A candidate activity object may be an object identified in the reviewable code but has not yet been determined if the identified object changes the application state of the application and/or if the identified object reconfigures the application to an application state that enables access to or display of content. It will be appreciated that there may be any number of activity objects that do not change the application state of the application or changes the application state of the application in a manner that does not lead to valuable content and/or functionality.

In some embodiments, the object identification module 908 may identify classes within the reviewable code to identify creation of a candidate activity object. The object identification module 908 may, in some embodiments, identify candidate activity objects that are to be received by the application through inspection of the reviewable code.

In various embodiments, the object identification module 908 may utilize pattern matching (e.g., syntactic pattern matching) to identify patterns of code segments that serve as entry and exit points to functions performed by the applications. For example, the object identification module 908 may identify activity objects and/or candidate activity objects based on patterns such as API calls, usage of components, and/or other functionality. In one example, a pattern may identify and/or isolate one or more functions which may be public (e.g., publicly exposed triggers to activate) and/or private.

In some embodiments, the object identification module 908 may retrieve pattern matching rules from the data store 814. The object identification module 908 may scan the reviewable code to identify code (e.g., including references to candidate activity objects) that matches one or more of the pattern matching rules in order to identify an activity object. In one example, one or more pattern matching rules may identify API calls in general (or specific API calls) and/or usage of components.

For example, the object identification module 908 may perform forward or backward analysis. In forward analysis, the object identification module 908 may initiate a process where a starting point for a pattern (e.g., the beginning of a process that may change the application state of the application) is recognized in the reviewable code (e.g., identifying a candidate activity object, an API call, or other functionality). The object identification module 908 may subsequently scan and/or review the reviewable code for other functionality that further matches the pattern until the pattern is matched. Once the pattern is matched, the activity object selection module 910 may identify the activity object and any parameter variables used in changing the application state.

In backward analysis, the object identification module 908 may start with an exit point (e.g., the ending of a process that changes the application state of the application) for a pattern that is recognized in the reviewable code. The object identification module 908 may subsequently scan and/or review the reviewable code for other functionality that further matches the pattern until the pattern is matched. As similarly discussed regarding forward analysis, once the pattern is matched, the activity object selection module 910 may identify the activity object and any parameter variables used in changing the application state.

In various embodiments, the object identification module 908 and/or the activity object selection module 910 may determine (e.g., using pattern matching) which activity objects change the application state of the application to a configuration that enables display of or otherwise provides content or functionality. The object identification module 908 and/or the activity object selection module 910 may ignore or otherwise filter out activity objects that do not change the application state of the application. Similarly, the object identification module 908 and/or the activity object selection module 910 may ignore of otherwise filter activity objects that change the application state of the application to a state that does not provide or enable providing content and/or functionality.

Although the object identification module 908 and/or the activity object selection module 910 are discussed herein as selecting activity objects and/or identifying candidate activity objects from the reviewable code, it will be appreciated that the activity objects may be selected and/or candidate activity objects identified in any number of ways. In various embodiments, the object identification module 908 and/or the activity object selection module 910 may utilize any function, formula, or the like to select activity objects and/or consider candidate activity objects. In some embodiments, a person may select any number of activity objects and/or identify candidate activity objects through review of the reviewable code.

The object tracking module 912 and the parameter discovery module 914 may be configured to identify parameter variables that are used by the activity objects to configure the application to another application state. In various embodiments, once an activity object is identified and/or selected, the object tracking module 912 may track the use of parameter variables (e.g., any variables) that are created and/or used by the activity object. The object tracking module 912 may trace the use of parameter variables in the reviewable code by the activity object to determine the functions of the activity object, the type of parameter variables, how the parameter values are used, and the effect of the parameter values.

In one example, the object tracking module 912 may review the reviewable code to track variables that the activity object stores in memory (e.g., in a memory register). The object tracking module 912 may track the variables stored in memory and how the variables impact functionality. For example, the reviewable code may indicate that the activity object stores a parameter variable in a particular memory register. The object tracking module 912 may track how that memory register is to be used in the reviewable instructions. The object tracking module 912 may, for example, review the reviewable to determine if the contents of the particular memory register are overwritten, the subject of mathematical functions, copied, used in other objects, or the like. By tracing the use of the variables of an activity object in the reviewable code, the object tracking module 912 and/or the parameter discovery module 914 may determine which variables are needed by the activity object to transition the application state of the application (e.g., which variables are parameter variables used with or by the activity object to transition to a new application state).

In some embodiments, the object tracking module 912 may identify steps the application may take (e.g., steps a user controlling the application may take) to navigate the application to an application state. In one example, the object tracking module 912 may track any number of functions of the application and/or activity objects of the application in the reviewable code to identify steps to reach an application state. The steps may include, but are not limited to, activating interactive elements (e.g., clicking buttons, clicking links, scrolling, and/or the like), entering text, retrieving information, and/or the like.

The static discovery module 902 may, in some embodiments, generate path instructions to configure an application to an application state based on the steps identified by the object tracking module 912. For example, by inspecting the reviewable code, the object tracking module 912 may identify the steps taken by the application to navigate to an application state. The object tracking module 912 and/or the static state transition tracking module 922 may generate path instructions including or based on the identified steps. The path instructions may, in some embodiments, be provided to the user device 104 (see FIG. 1). As discussed herein, the path module 128 of the state access module 116 may configure a native application 130 (see FIG. 1) utilizing an accessibility application and/or accessibility service and the path instructions.

In various embodiments, the parameter discovery module 914 may identify any number of parameter variables that the reviewable code indicates are used by the activity object to configured the application to an application state. The parameter discovery module 914 may, based on the tracking of the object tracking module 912, identify any number of parameter variables.

The static semantic module 916 may be configured to discover semantic information (e.g., meanings, categories, labels, and/or the like) of the function of an activity object and/or any related parameter variables. In various embodiments, the static semantic module 916 may scan the reviewable code and/or utilize information from the object identification module 908, the object tracking module 912, and/or the parameter discovery module 914 to provide semantic information associated with the activity object and/or parameter variables.

For example, the static semantic module 916 may scan the reviewable code to determine how an activity object is used and the functions that the activity object performs. The static semantic module 916 may, based on the reviewable code, provide a description describing any number of functions and/or results associated with the activity object. In one example, the static semantic module 916 may utilize semantic rules (e.g., retrieved from the data store 814). The static semantic module 916 may compare the function and/or output of an activity object to conditions indicated by one or more of the semantic rules. The semantic rules that identify any number of descriptions or identifiers that provide semantic meaning to those activity objects with functions and/or output that meets the conditions identified by the semantic rule(s).

In various embodiments, the static semantic module 916 may summarize or otherwise provide information regarding functions and/or output of any number of activity objects to a user (e.g., administrator), another application, or operating system to enable semantic meaning regarding the activity function to be assigned, characterized, and/or provided.

In some embodiments, semantic meaning of the activity object and any parameter variables may allow for efficient storage and retrieval of information from the knowledge system 804. For example, the semantic meaning of output or functionality of an activity object allow for the activity object, associated parameter value(s), instructions indicating the activity object and associated parameter value(s), to be associated with and stored in the knowledge system 804. In some embodiments, the static semantic module 916 may identify semantic meaning and/or attributes associated with semantic meaning based on how the activity object is defined or usage of parameter values, functionality, and/or output indicated in the reviewable code. The static semantic module 916 may associate descriptions, identifiers, or the like (e.g., semantic meaning) with any number of categories such as tags. The categories may be associated with or similar to categories utilized in the knowledge system 804 or any data store (e.g., search system described herein).

The static semantic module 916 may summarize or otherwise provide information regarding any number of parameter variables to a user (e.g., administrator), another application, or operating system to enable semantic meaning of the parameter variables to be assigned, characterized, and/or provided.

In some embodiments, the semantic meaning of parameter variables are associated with and stored in the knowledge system 804. The static semantic module 916 may associate descriptions, identifiers, or the like (e.g., semantic meaning of parameter variables) with any number of categories such as tags. The categories may be associated with or similar to categories utilized in the knowledge system 804.

The static semantic module 916 may identify parameter values associated with parameter variables from the reviewable code. In some embodiments, the static semantic module 916 may review or scan the reviewable code for parameter values or indications of parameter values associated with the parameter variables. The static semantic module 916 may, for example, identify parameter values or at least attributes of parameter values based on definitions of parameter variables (e.g., integers, strings, or the like) and/or use of parameter variables. Further, the static semantic module 916 may identify parameter values based on indications of the reviewable code of use of parameter values and functionality of the associated activity object.

The state access instruction generation module 918 may be configured to generate state access instructions based on the activity object identified by the object identification module 908 and/or the activity object selection module 910. Further, the state access instruction generation module 918 may generate the state access instructions based on any parameter variables identified by the parameter discovery module 914 that is associated with the activity object.

The state access instruction generation module 918 may generate state access instructions including, but not limited to template function. As discussed herein, a template function instruction is an instruction that indicates the activity object (e.g., an application resource identifier) and includes associated parameter variables (if any). The template function instruction may be machine readable code. In some embodiments, the parameter variables are associated with any number of parameter values. For example, the parameter variables may indicate or be associated with a set of parameter values such as a set of parameter values maintained by the knowledge system 804 or other system. In some embodiments, the parameter variables are not associated with any parameter values. Parameter variables may be associated with parameter values at any time (e.g., by the application state discovery engine 810, an administrator, an application, another device, or the like).

The state access instruction generation module 918 may generate state access instructions that include references to the activity object (e.g., the application resource identifier) and any associate parameter values (i.e., not parameter variables).

The state access instruction generation module 918 may generate state access instructions in any format or language. In some embodiments, the state access instruction generation module 918 generates each state access instruction in a language and/or in a format that is understandable by an application.

In various embodiments, a state access instruction generated by the state access instruction generation module 918 may be used to configure an application to a particular application state. The application may, as a result of being configured to the particular application state, provide content or other functionality.

In some embodiments, the state access instruction generation module 918 generates path instructions to configure an application to an application state based on the steps identified by the object tracking module 912. As discussed herein, by inspecting the reviewable code, the object tracking module 912 may identify the steps taken by the application to navigate to an application state. The path instructions may, in some embodiments, be provided to the user device 104 (see FIG. 1). As discussed herein, the path module 128 of the state access module 116 may configure a native application 130 (see FIG. 1) utilizing an accessibility application and/or accessibility service and the path instructions.

The static state access instruction report module 920 may generate a state access instruction report including any number of state access instructions provided by the state access instruction generation module 918. The static state access instruction report may include a list of state access instructions. In one example, the static state access instruction report may include one or more template function instructions having application resource identifiers and/or parameter variables. In another example, the static state access instruction report may include one or more state access instructions having application resource identifiers and/or parameter values. The static state access instruction report may be formatted in XML. An example portion of a static application state instruction report is depicted in FIG. 11 which is further discussed herein.

In some embodiments, the static state access instruction report module 920 may include path instructions in the state access instruction report. For example, the state access instruction report may include both state access instructions and path instructions (e.g., state access instructions and path instructions may each configure the same application to the same application state). In some embodiments, that state access instruction report may include both state access instructions and path instructions to configure different applications to different application states. In various embodiments, the static state access instruction report module 920 may generate a path instruction report including path instructions. For example, the static state access instruction report module 920 may generate a state access instruction report and/or a path instruction report.

The static state transition tracking module 922 may be configured to track which application state associated with state access instructions are accessible (e.g., without privileges). For example, as discussed herein, a manifest file may indicate published, available intents that may be used to configure an application to a particular application state. The intents identified by the manifest file may configure the application without requiring privileges (e.g., the state of the application is directly accessible without privileges). In other words, the intents identified by the manifest may identify application states that are externally accessible as described herein. Other application states (e.g., other intents) may not be accessed without privileges unless manually navigating the application. For example, an application may require privileges or other requirements before allowing the application to be reconfigured using a state access instruction. As described herein, the application state may be externally inaccessible.

In various embodiments, the static state transition tracking module 922 may review the reviewable code (e.g., including the function of activity objects and/or parameter variables in the reviewable code) to determine which application states are accessible without privileges (e.g., determining if privileges are required to execute a class, activity object, activity object functionality, and/or parameter variables). If a state access instruction is associated with an application state that is not accessible without privileges, then the static state transition tracking module 922 may flag the state access instruction with an indication that the associated state may not be directly accessed.

For example, the static state transition tracking module 922 may identify, based on the reviewable code using systems and methods described herein, which application states are externally accessible and/or externally inaccessible. The static state transition tracking module 922 may generate an accessibility indicator based on the identification.

In various embodiments, the static state transition tracking module 922 may provide accessibility indicators to any digital device or application. The static state transition tracking module 922 may, for example, provide any number of accessibility indicators to the search system 102 (see FIG. 1), the state access module 116 (e.g., upon request to the external access module 120 also shown in FIG. 1), the data store 814 (see FIG. 8), and/or the knowledge system 804 (e.g., to the corpus data store 818 also shown in FIG. 8). In some embodiments, the accessibility indicators may be included in search results from the search system 102 to the user device 104 (see FIG. 1), the state access instructions (e.g., generated by the state access instruction generation module 918), path instructions, the state access instruction reports (e.g., generated by the static state access instruction report module 920), and/or the path instruction report.

The dynamic discovery module 904 may execute the application to enable identification of semantic meaning for activity objects and/or parameter variables. In one example, a state access instruction may be utilized to configure an application to a particular application state. The application may, once configured, provide an output interface including content. The content may, in some examples, be from the application, retrieved by the application locally to display in the output interface, or received from another source (e.g., an application server such as application server 806-1). A user and/or the dynamic discovery module 904 may associate the state, activity object, state access instructions and/or the like with semantic meaning based, in part, on the output interface and/or content of the output interface. Similarly, a user and/or the dynamic discovery module 904 may, in some examples, associate parameter variables and/or parameter values with semantic meaning based on the application, application usage, output interface, and/or content.

In some embodiments, the dynamic discovery module 904 may execute the application to identify previously undiscovered application states and/or identify activity objects. In one example, an administrator or another application (e.g., automated function) may navigate the application to achieve different application states. The dynamic discovery module 904 may monitor commands, the operation of the application, and parameters. If a new application state is identified, the dynamic discovery module 904 may generate a state access instruction (e.g., template) associated with the new application state. The state access instruction may be included within or added to a state access instruction report as previously discussed herein.

The dynamic discovery module 904 may comprise an environment module 924, a state configuration module 926, a dynamic semantic module 932, a dynamic state transition identification module 934, a dynamic state transition tracking module 936, and a dynamic state access instruction report module 938. The state configuration module 926 may comprise a state access instruction selection module 928 and a parameter module 930.

The environment module 924 may create, provision, and/or enable an environment to run the application. In some embodiments, the environment module 924 may provide emulation and/or virtualization. In various embodiments, the environment module 924 may provide an environment without emulation or virtualization (e.g., a digital device running an operating system such as a mobile device running the Android™ OS).

In various embodiments, the environment module 924 is configured to run and monitor the application in an emulated environment whereby mobile device hardware is simulated in software. For example, the application may run in the emulated environment as if the application was on a mobile device (e.g., running the Android™ OS). The emulated environment may allow the application to have direct memory access (e.g., a bare metal environment). The behavior of the application may be monitored and/or tracked to track function operations and data stored in memory (e.g., track application behavior including memory registers, functions, APIs, and the like). For example, the emulated environment may track what resources (e.g., applications and/or operating system files) are called in processing by the application as well as what data is stored.

In some embodiments, the environment module 924 may be configured to run and monitor the application in a virtualization whereby some parts of the mobile device hardware may be simulated. The virtualization may track application behavior including memory registers, functions, APIs, and the like. For example, the virtualization environment may track what resources (e.g., applications and/or operating system files) are called in processing by the application as well as what data is stored.

In various embodiments, a single digital device may run in any number of virtualized environments as if each application was on a mobile device. The application may be instantiated in each environment. A different state access instruction may be utilized to configure the application to different application states in different environments (e.g., in parallel) thereby achieving scalability. Similarly, any number of emulated environments may be created. The application may be instantiated in each environment and different state access instructions utilized to configured the application to different states in parallel. Further, in some embodiments, the same application may be instantiated in both emulation and virtualization environments.

The state configuration module 926 may configure the application within the environment to an application state. For example, the state configuration module 926 may provide or execute a state access instruction (e.g., a template function instruction) to configure the application to the desired application state. The application may be configured and subsequently generate, in one example, an output interface that may display content, indicate functionality, or the like. In some embodiments, the application may retrieve content from any source such as a remote server (e.g., application server 806-1) to display in the output interface. It will be appreciated that content provided by an application at a particular application state may be unknown based on the reviewable code. By running and configuring the application to a particular application state in an environment (e.g., provided by the environment module 924), the application state, related activity object, parameter variables, parameter values, content, and/or the like may be better understood. As a result, the application state, related activity object, parameter variables, parameter values, content, and/or the like may be better described (e.g., associated with categories and/or tags based on semantic meaning).

The state configuration module 926 may include a state access instruction selection module 928 and a parameter module 930. The state access instruction selection module 928 may retrieve a state access instruction report and/or a state access instruction from the state access instruction report (e.g., generated or otherwise provided by the static discovery module 902) to configure the application in the environment. The state access instruction selection module 928 may utilize any number of the state access instructions and/or select any or all of the state access instructions in any order.

Once a state access instruction is selected by the state access instruction selection module 928, the parameter module 930 may retrieve and/or provide any values associated with any parameter variables indicated by the state access instruction. For example, the parameter module 930 may receive semantic information, categories (e.g., tags) or the like associating one or more parameter variables with one or more parameter values (e.g., any of a set of parameter values stored in the knowledge system 804). The parameter module 930 may provide any number of parameter values to the state access instruction, the application, environment, or the like to assist in configuration of the application.

For example, the state access instruction may include instructions to configure an application to provide restaurant reviews. The parameter module 930 may identify a parameter variable of the state access instruction and retrieve one or more parameter values (e.g., zip codes) from the knowledge system 804 to provide to the application with the instructions. Subsequently, the application may be configured to provide restaurant reviews for the zip code provided by the parameter module 930.

In various embodiments, the state configuration module 926 may identify steps the applications may take (e.g., which may be similar to steps a user controlling the application may take) to navigate the application to an application state. In one example, the state configuration module 926 may track screens (e.g., output interfaces), information provided to the application, manipulation of interactive elements (e.g., clicking buttons, clicking links, scrolling, and/or the like), provided text, retrieved information, and/or the like.

The state configuration module 926 may, in some embodiments, generate path instructions to configure an application to an application state based on the steps. For example, by executing the application in the environment, the state configuration module 926 may identify the steps taken by the application to navigate to an application state. The state configuration module 926 may generate path instructions including or based on the identified steps. The path instructions may, in some embodiments, be provided to the user device 104 (see FIG. 1). As discussed herein, the path module 128 of the state access module 116 may configure a native application 130 (see FIG. 1) utilizing an accessibility application and/or accessibility service and the path instructions.

The dynamic semantic module 932 may be configured to discover semantic information (e.g., meanings, categories, labels, and/or the like) of the function of an activity object and/or any related parameter variables from the dynamic environment. The dynamic semantic module 932 may provide semantic information associated with the activity object, parameter variables, state access instruction, output interface, parameter values, or the like.

For example, the dynamic semantic module 932 may scan an output interface provided by the application that is configured to a particular application state. The dynamic semantic module 932 may, based on content of the output interface, provide a description describing any number of functions and/or results associated with the application state. In one example, the dynamic semantic module 932 may utilize semantic rules (e.g., retrieved from the data store 814). The dynamic semantic module 932 may compare the function and/or output of the application to conditions indicated by one or more of the semantic rules. The semantic rules that identify any number of descriptions or identifiers that provide semantic meaning to those states or related activity object, parameter variables, state access instruction, output interface, and/or parameter values.

In some embodiments, the dynamic semantic module 932 may collect or identify a subset of parameter values (e.g., a seven digit number) which may indicate the type of information needed to transition application states. For example, the dynamic semantic module 932 may indicate or display a sample parameter value to a user who can assign a description or describe the meaning of the sample parameter value (e.g., the user assigns the tag "zip code" to the parameter variable and/or value based on the sample).

In various embodiments, the dynamic semantic module 932 may receive semantic information from a user such as an administrator. For example, the application may be display an output interface to the user. The user may provide the dynamic semantic module 932 with any indication, meanings, descriptions, identifiers, or the like to provide semantic meaning. In some embodiments, the administrator may further provide information associating the semantic meaning with categories of the knowledge system 804. The dynamic semantic module 932 may associate or store state access instructions, state access instruction reports, parameter variables, parameter values, and/or the like in the knowledge system 804.

As discussed herein, semantic meaning of the activity object and any parameter variables may allow for efficient storage and retrieval of information from the knowledge system 804. For example, the semantic meaning of output or functionality of an activity object allow for the activity object, associated parameter value(s), instructions indicating the activity object and associated parameter variable(s), are associated with and stored in the knowledge system 804. The dynamic semantic module 932 may associate descriptions, identifiers, or the like (e.g., semantic meaning) with any number of categories such as tags. The categories may be associated with or similar to categories utilized in the knowledge system 804.

The dynamic semantic module 932 may summarize or otherwise provide information regarding any number of parameter variables to a user (e.g., administrator), another application, or operating system to enable semantic meaning of the parameter variables to be assigned, characterized, and/or provided.

In some embodiments, the semantic meaning of parameter variables are associated with and stored in the knowledge system 804. The dynamic semantic module 932 may associate descriptions, identifiers, or the like (e.g., semantic meaning of parameter variables) with any number of categories such as tags. The categories may be associated with or similar to categories utilized in the knowledge system 804.

The dynamic state transition identification module 934 may identify new application states based on execution, configuration, and reconfiguration of an application in the environment. In some embodiments, the environment enables a user to interact with an application. The interaction may configure the application to reach a new, previously unpublished, application state. It will be appreciated that the dynamic state transition identification module 934 may track and identify function calls, activity objects, parameter variables, parameter values, and/or the like. The dynamic state transition identification module 934 may track activity objects, parameter variables, and/or parameter values associated with the configuring the application to the application state. Subsequently, the dynamic state transition identification module 934 may generate and/or store a state access instruction that may be utilized to return the application to the previously undiscovered application state. The dynamic state transition identification module 934 may include the new state access instruction in the state access instruction report.

In some embodiments, the dynamic state transition identification module 934 generate path instructions to configure an application to an application state based on the steps identified by the state configuration module 926. As discussed herein, by executing the application in the environment, state configuration module 926 may identify the steps taken by the application to navigate to an application state. The path instructions may, in some embodiments, be provided to the user device 104 (see FIG. 1). The dynamic state transition identification module 934 may include the new path instructions in the state access instruction report and/or the path instruction report.

In various embodiments, the dynamic state transition identification module 934 may inspect execution of code in runtime. In some embodiments, the dynamic state transition identification module 934 may hook various APIs, collect parameters, and/or collect interprocess communication messages to identify new application states and provide context for application states, parameters, and/or the like. The dynamic state transition identification module 934 may perform application level and/or operating system level hooking. In some embodiments, the dynamic state transition identification module 934 may identify an object passing into the application. The dynamic state transition identification module 934 may analyze the object and context to better understand the object.

The dynamic state transition tracking module 936, similar to the static state transition tracking module 922, may be configured to track which application state associated with state access instructions are accessible (e.g., without privileges) and which may be indirectly accessible (e.g., manual navigation of the application and/or having privileges). Application states that may be directly accessed (e.g., using a state access instruction, the application may be configured to a particular application state without privileges which may indicate that the application state is externally accessible) or indirectly accessed (e.g., requiring operating system privileges or navigation of the application in a manner that may be similar to a user which may indicate that the application state is externally inaccessible).

In various embodiments, the dynamic state transition tracking module 936 tracks and/or provides an indication whether any number of state access instructions of the state access instruction report allow for direct access to an application state or allow for indirect access to the application state. The dynamic state transition tracking module 936 may track and/or determine if an application state associated with an activity object is directly accessible or indirectly accessible based on the execution, configuration, and reconfiguration of the application.

The dynamic state transition tracking module 936 may identify, based on executing the application in the environment using systems and methods described herein, which application states are externally accessible and/or externally inaccessible. The dynamic state transition tracking module 936 may generate an accessibility indicator based on the identification.

In various embodiments, the dynamic state transition tracking module 936 may provide accessibility indicators to any digital device or application. The dynamic state transition tracking module 936 may, for example, provide any number of accessibility indicators to the search system 102 (see FIG. 1), the state access module 116 (e.g., upon request to the external access module 120 also shown in FIG. 1), the data store 814 (see FIG. 8), and/or the knowledge system 804 (e.g., to the corpus data store 818 also shown in FIG. 8). In some embodiments, the accessibility indicators may be included in search results from the search system 102 to the user device 104 (see FIG. 1), the state access instructions (e.g., generated by the state access instruction generation module 918), path instructions, the state access instruction reports (e.g., generated by the static state access instruction report module 920), and/or the path instruction report.

The dynamic state access instruction report module 938 may be configured to generate access instructions (e.g., for a previously undiscovered application state that is discovered while the application is executed in the environment) and/or provide any additional information in the state access instruction report. The dynamic state access instruction report module 938 may also be configured to generate path instructions and/or provide any additional information in the state access instruction report and/or path instruction report.

In some embodiments, the dynamic state access instruction report module 938 associates parameter variables of state access applications with parameter values of the knowledge system 804 and stores the association (e.g., stores links between the parameter variable and the parameter values of the knowledge system 804) in the state access instruction report.

Figure 10:
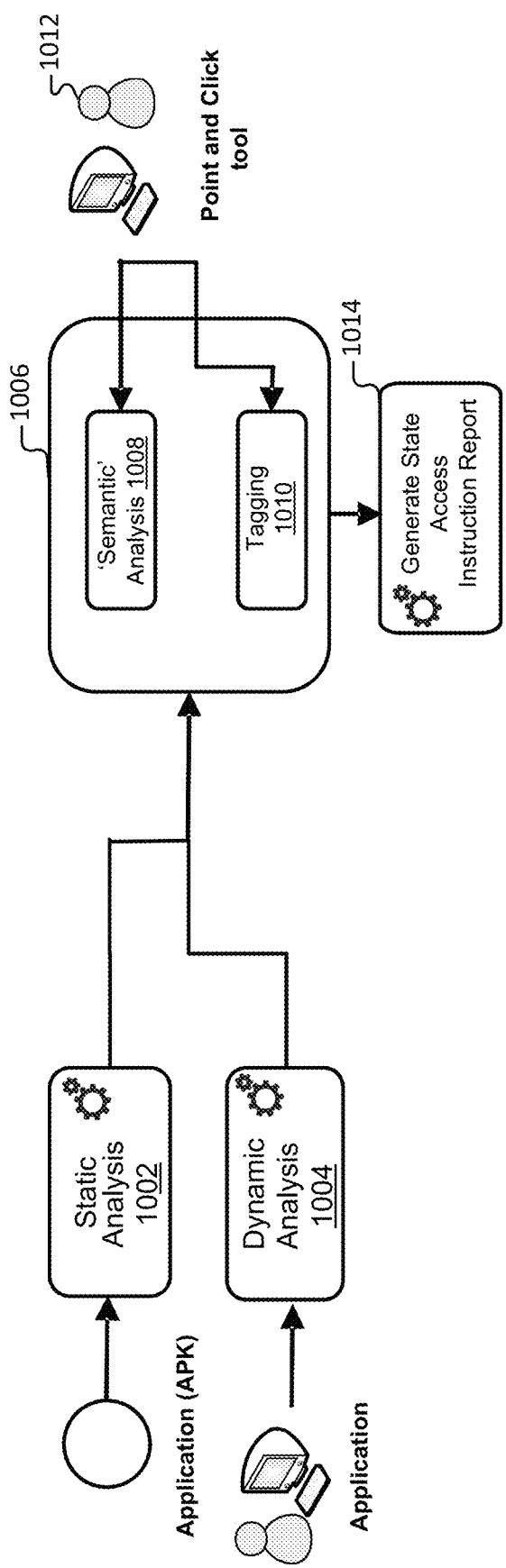
FIG. 10 is a diagram of the generation of the state access instruction report and semantic meaning in some embodiments.

FIG. 10 is a diagram of the generation of the state access instruction report and semantic meaning in some embodiments. In FIG. 10, static analysis 1002 may be performed on an application APK. As discussed herein, static analysis 1002 may comprise pre-processing (e.g., decompiling, decompressing, parsing, and/or the like) all or some of the APK (e.g., dex files of the APK) to a reviewable code. The reviewable code may also be machine readable code. During static analysis 1002, the code may be reviewed for activity objects (e.g., intents) that may configure the application to an application state. The state and/or activity object may not have been previously published by the application developer (e.g., the application state and/or activity object may not have been indicated in the Application's manifest file).

Subsequently or in parallel with the static analysis 1002, a dynamic analysis 1004 may be performed on the application. For example, an emulated environment may be created and an instance of the application instantiated. Since the environment is emulated, the application may perform as if the application was installed on a mobile device. Further, the emulated environment may monitor interactions with hardware, memory registers, and the like. As a result, the emulated environment may identify instructions and/or parameter values that configure the application to a previously undisclosed state.

Determining meaning (e.g., description or assignment of identifiers such as tags) 1006 may include semantic analysis 1008 and/tagging 1010. In various embodiments, an administrator 1012 or other user may view output (e.g., an output interface) from the application in the dynamic analysis 1004 and provide semantic meaning associated with the application state, activity objects called to obtain the application state, parameter variables, example parameter values, content, and/or the like. The administrator 1012 or any other entity (e.g., application, server, device, or the like) may associate the application state, activity objects called to obtain the application state, parameter variables, example parameter values, content, and/or the like with categories or tags 1010. In some embodiments, the categories or tags 1010 are associated with the knowledge system 804.

In some embodiments, the administrator 1012 or other user may view the reviewable code in the static analysis 1002 and provide semantic meaning associated with the application state, activity objects called to obtain the application state, parameter variables, example parameter values, content, and/or the like as similarly discussed regarding the dynamic analysis 1004. The administrator 1012 or any other entity (e.g., application, server, device, or the like) may associate the state, activity objects called to obtain the application state, parameter variables, example parameter values, content, and/or the like with categories or tags 1010.

State access instructions and/or path instructions may be created and/or stored in a state access instruction report and/or a path instruction report. The state access instructions may include activity objects and/or parameter variables (or parameter values) as determined in the static analysis 1002 and/or the dynamic analysis 1004. The state access instructions may include the tags 1010 (e.g., parameter variables that correspond to parameter values such as those that may be stored in the knowledge system 804).

FIG. 11 is a portion of a state access instruction report in some embodiments. The state access instruction report may be in any language and/or in any format. The portion of the state access instruction report as shown in FIG. 11 is in XML. The application name 1102 identifies an application package. In some embodiments, any number of the state access instructions of the state access instruction report may be utilized to change the application state of the application identified by the application name 1102. The deepstate name 1104 may identify the desired application state of the application to be reached with the state access instruction. The intent target 1106 may indicate that activity object (e.g., function instructions) that may configure the application to the application state identified by deepstate name 1104.

The parameters shown in FIG. 11 define and indicate parameter variables for the activity object to be called by the state access instruction. The parameters may indicate parameter values to be received from a user, from the knowledge system 804, and/or another application.

It will be appreciated that the state access instruction report may have any number of state access instructions.

Figure 12:
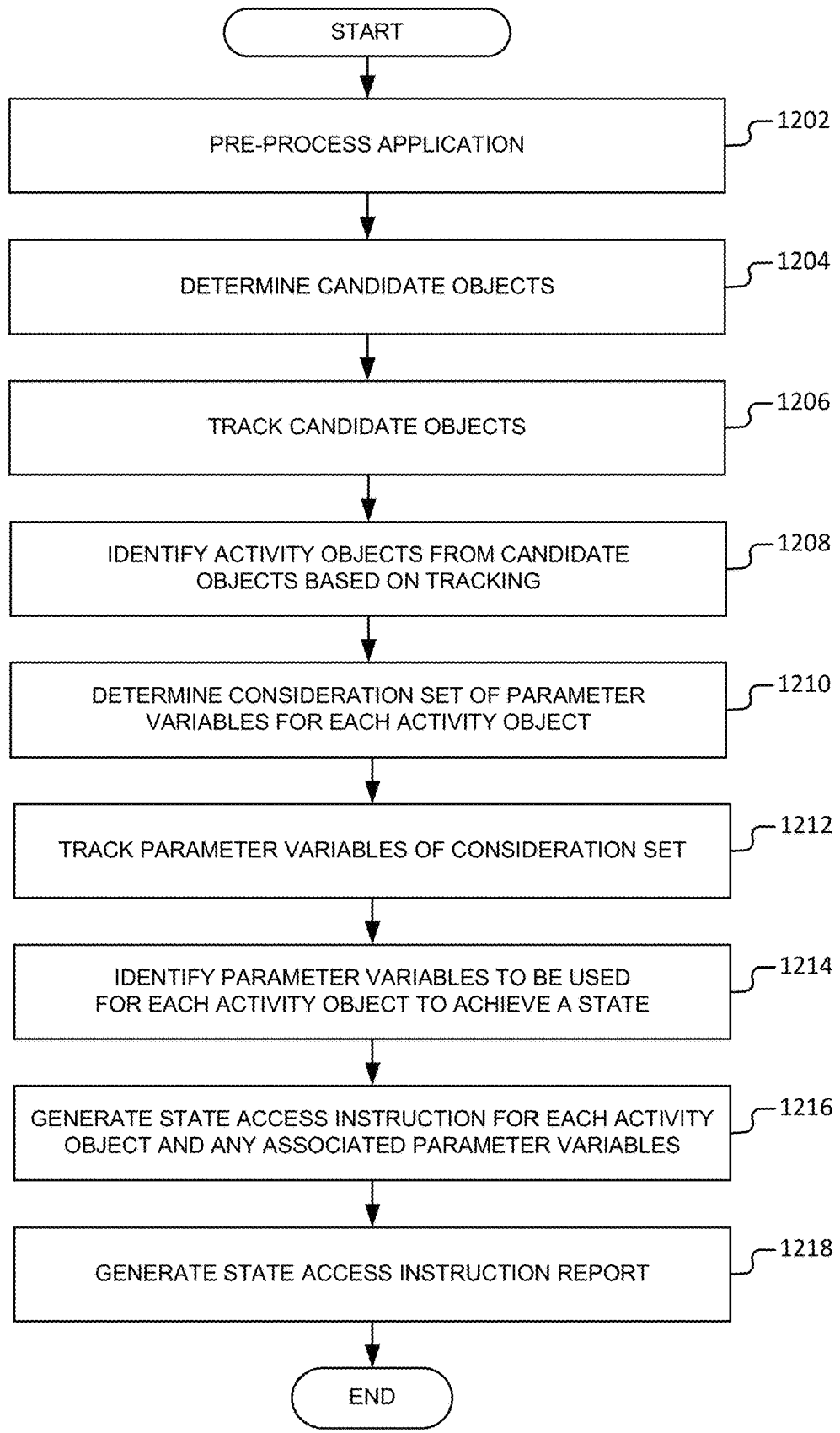
FIG. 12 is a flowchart of an example method for discovering application states of an application.

FIG. 12 is a flowchart of an example method for discovering application states of an application. In step 1202, the pre-processing module 906 of the static discovery module 902 may decompile an application. The application may be any application including, for example, an application executable on a mobile device. In some embodiments, the pre-processing module 906 decompiles, decompresses, parses, and/or the like the application code to a reviewable code. The reviewable code is code that may be reviewed by a user (e.g., administrator) and/or other module or other digital device.

In various embodiments, the pre-processing module 906 decompresses an application package, extracts the desired code (e.g., a subset of the package contents) from the package, and decompiles the extracted, desired code into reviewable code. The pre-processing module 906 may parse the decompiled code.

In step 1204, the object identification module 908 determines candidate objects (e.g., candidate activity objects). A candidate object is any object that may change or assist in changing the application state of the application. It will be appreciated that the reviewable code of an object may indicate or suggest functionality that changes or assists in changing the application state of the application. In some embodiments, the object identification module 908 may scan the reviewable code to identify any number of candidate objects. In some embodiments, the object identification module 908 may compare an object from the reviewable code to any number of patterns and/or object templates that may indicate the desired functionality (e.g., changing or assisting in changing an application state) to identify the candidate objects.

In step 1206, the object tracking module 912 may track the candidate objects in the reviewable code. For example, the activity object selection module 910 may select a candidate object of a set of candidate objects identified by the object identification module 908. The object tracking module 912 may track or trace the candidate object's functionality and the functionality of the application that affect the candidate object through the reviewable code.

In step 1208, the object tracking module 912 may identify objects based on tracking. In some embodiments, the object tracking module 912 may retrieve or receive pattern matching rules (e.g., from the data store 814). The pattern matching rules may enable the object tracking module 912 to identify activity objects based on recognized patterns of code and/or functionality identified in the reviewable code.

It will be appreciated that there may be different pattern matching rules for different applications. For example, there may be pattern matching rules for a review application and different pattern matching rules for a recommendation application. A recommendation application may be an application that recommends business or services to a user based on criteria provided by the user, such as recommending restaurants, cleaning services, or the like. The object tracking module 912 may identify the application that will be or is pre-processed. The object tracking module 912 may subsequently retrieve pattern matching rules based on the identified application.

For example, the object tracking module 912 may initiate a process where a starting point for a pattern (e.g., the first function or activity associated with the candidate object) recognized in the reviewable code and subsequently scan and/or review the reviewable code for other functionality that further matches the pattern until the pattern is matched (i.e., forward matching). In another example, the object tracking module 912 may initiate a process with an exit point (e.g., the ending of a process that changes the application state of the application) and subsequently scan and/or review the reviewable code for other functionality that further matches the pattern until the pattern is matched (i.e., backward matching).

It will be appreciated that the object tracking module 912 may recognize or otherwise identify an activity object in any number of ways.

In step 1210, the parameter discovery module 914 determines a consideration set of parameter variables for each activity object. For example, the object tracking module 912 may identify an activity object based on object tracing using the reviewable code. The parameter discovery module 914 may identify all parameter variables that may be used by the activity object (e.g., including those parameter variables in the activity object definition) that may be used to change or assist in changing the application state of the application.

In various embodiments, the parameter discovery module 914 may identify parameter variables to add to the consideration set of parameter variables. The parameter discovery module 914 may include any number of variables created or used by the activity object as indicated in the reviewable code. The parameter discovery module 914 may also include any number of variables that may affect the functionality of the activity object as indicated in the reviewable code.

In step 1212, the parameter discovery module 914 may track variables of the consideration set to identify parameter variables. For example, the parameter discovery module 914 may trace the function and use of each variable in the reviewable code to identify those variables (i.e., parameter variables) that may be used by or with the activity object to change the application state of the application.

In step 1214, the parameter discovery module 914 identifies parameter variables to be used by or with each activity object to change the application to different application states. In one example, the parameter discovery module 914 identifies parameter variables based on the tracking of variables of the consideration set.

In step 1216, the state access instruction generation module 918 may generate one or more state access instruction(s) for each activity object and any associated parameter variables. For example, the state access instruction generation module 918 may generate a state access instruction identifying the activity object and parameter variables identified by the parameter discovery module 914. In one example, the state access instruction may be template state instruction that may be used to configure or assist in the configuration of an application to a new state. The state access instruction generation module 918 may generate one or more path instruction(s) for any identified application states.

The template state instruction may include an identification (or call) of the activity object (e.g., an application resource identifier) and the parameter variable(s) (if any). The parameter variables may refer to values (e.g., parameter values) that may be stored (e.g., in the knowledge system 804, by the application, another data store, another application, or remotely). In various embodiments, the state access instruction (e.g., template state instruction) may be stored (e.g., in the knowledge system).

In step 1218, the static state access instruction report module 920 may generate a report including any or all of the state access instruction(s) and/or path instruction(s) from the state access instruction generation module 918.

Figure 13:
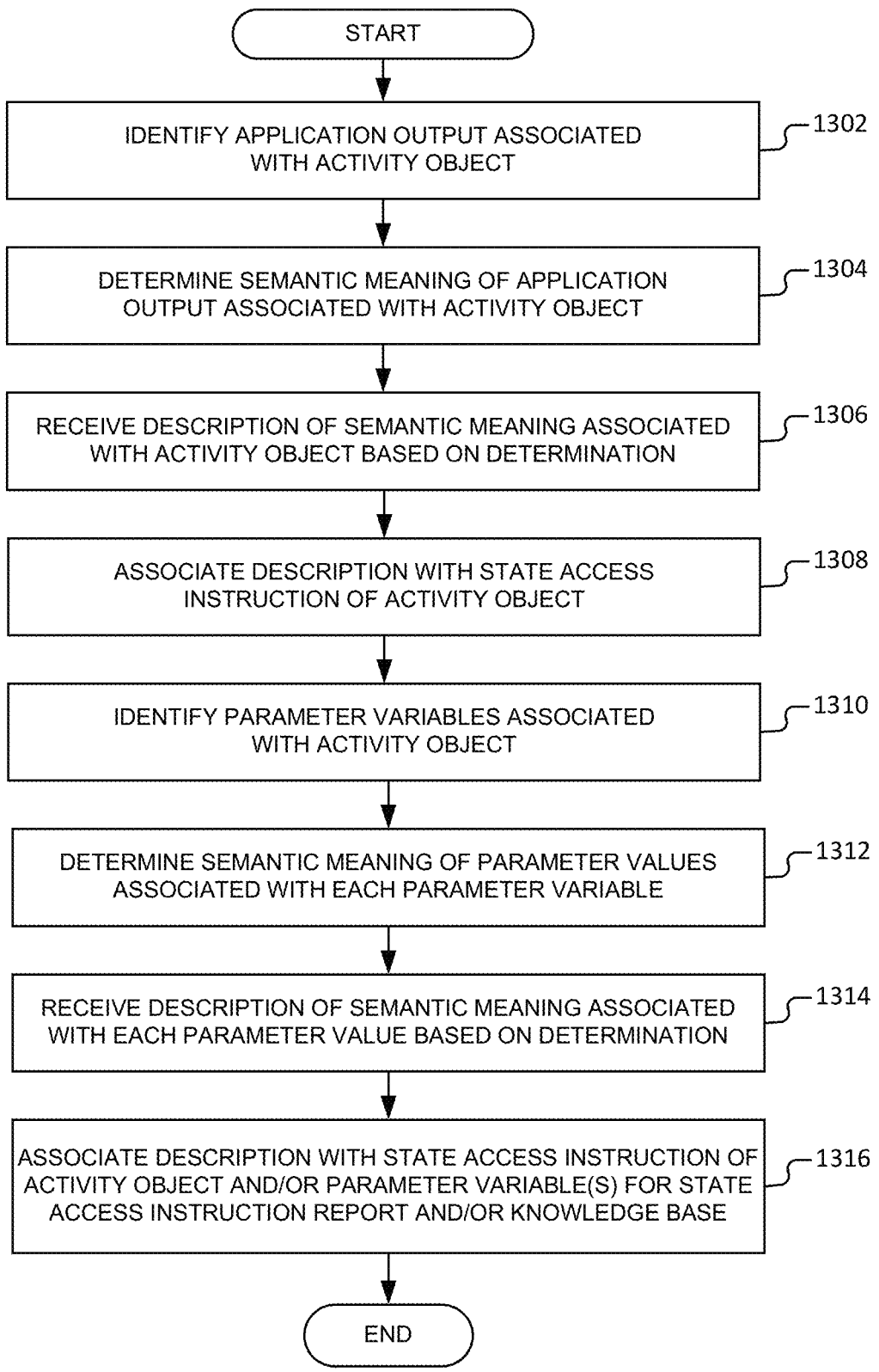
FIG. 13 is a flowchart of an example method for identifying semantic meaning associated with an activity object and associated parameter variables (if any) in some embodiments.

FIG. 13 is a flowchart of an example method for identifying semantic meaning associated with an activity object and associated parameter variables (if any) in some embodiments. In step 1302, the static semantic module 916 may identify application output (e.g., an output interface or contents that may appear in an output interface as identified by the reviewable code) associated with the activity object. For example, the static semantic module 916 may review the reviewable code to identify an indication of a change of state caused by or related to an activity object. Based on review of the reviewable code, the static semantic module 916 may identify the output of the application when the application is configured to reach the desired application state.

In step 1304, the static semantic module 916 determines semantic meaning of the application output associated with the activity object. In various embodiments, the static semantic module 916 may receive or retrieve semantic rules (e.g., from the data store 814). The semantic rules may provide associations between one or more portions (e.g., elements and/or functions) of reviewable code and predetermined meanings. For example, the semantic rules may associate portions of code used to generate, receive, or provide names of eating establishments with a semantic meaning (e.g., "restaurants").

It will be appreciated that the application state discovery engine 810 may include or be associated with a machine learning module configured to learn associations of portions of reviewable code and meaning. In some embodiments, a machine learning module may be configured to scan or review the reviewable code to identify semantic meaning. The machine learning module may also be trained using predetermined associations.

In step 1306, the static semantic module 916 may receive a description of semantic meaning associated with the activity object based on the determination. In various embodiments, an administrator or another application may receive or identify an activity object from the reviewable code and indications of output associated with the function of the activity object. The indications of output may also be indicated by the reviewable code. In some embodiments, the administrator may provide semantic meaning to the static semantic module 916.

It will be appreciated that the semantic meaning may be determined and/or received in any number of ways. Further, semantic meaning maybe provided by any number of administrators and/or automated. If output associated with an activity object receives different indications of meaning, the static semantic module 916 may provide the different meanings to an administrator or resolve the many meanings in any number of ways.

In step 1308, the static semantic module 916 associates the description with a state access instruction of the activity object. In various embodiments, the static semantic module 916 may associate the description and/or categories associated with the description with a state access instruction. For example, the state access instruction generation module 918 may generate a state access instruction that identifies an activity object and any associated parameter variables that may be used to configure an application to a particular application state. Output associated with that particular application state may be characterized with semantic meaning (e.g., descriptions). The semantic meaning may further be categorized or tagged by the static semantic module 916. The static semantic module 916 may categorize the semantic meaning using categories that categorize content within the knowledge system 804.

In step 1310, the static semantic module 916 identifies parameter variables associated with the activity object. As previously discussed, the state access instruction generation module 918 may generate a state access instruction that identifies an activity object and associated parameter variables that may be used to configure an application to a particular state. The reviewable code may provide indications of the semantic meaning of any number of parameter variables.

In step 1312, the static semantic module 916 determines semantic meaning of parameter variables. In some embodiments, the static semantic module 916 identifies the meaning of parameter values associated with a parameter variable. The semantic meaning of the parameter values may then be associated with the parameter variable. For example, the static semantic module 916 may identify parameter values associated with the parameter variables. If the parameter values are, for example, zip codes, the static semantic module 916 may associate the semantic meaning "zip code" with the parameter variable.

In step 1314, the static semantic module 916 may receive a description of semantic meaning associated with each parameter value based on the determination. In some embodiments, the static semantic module 916 may identify and/or provide indications of use of any number of variables in the reviewable code. A user, static semantic module 916, another application, and/or machine learning module may provide semantic meaning of any or all parameter variables associated with an activity object (e.g., based on the reviewable code and/or any information provided by the static semantic module 916). The semantic meaning of parameter variables may further be categorized or tagged by the static semantic module 916. The static semantic module 916 may categorize the semantic meaning of parameter variables using categories that categorize content within the knowledge system 804.

In step 1316, the static semantic module 916 associates the description of the semantic meaning of any number of parameter variables with a state access instruction of the activity object. In various embodiments, the static semantic module 916 may associate the description and/or categories associated with the description of parameter variables with a state access instruction. As previously discussed, the state access instruction generation module 918 may generate a state access instruction that identifies an activity object and any associated parameter variables that may be used to configure an application to a particular state. Parameter variables and/or parameter values may be associated with semantic meaning. The semantic meaning may further be categorized or tagged by the static semantic module 916. The static semantic module 916 may categorize the semantic meaning using categories that categorize content within the knowledge system 804.

Figure 14:
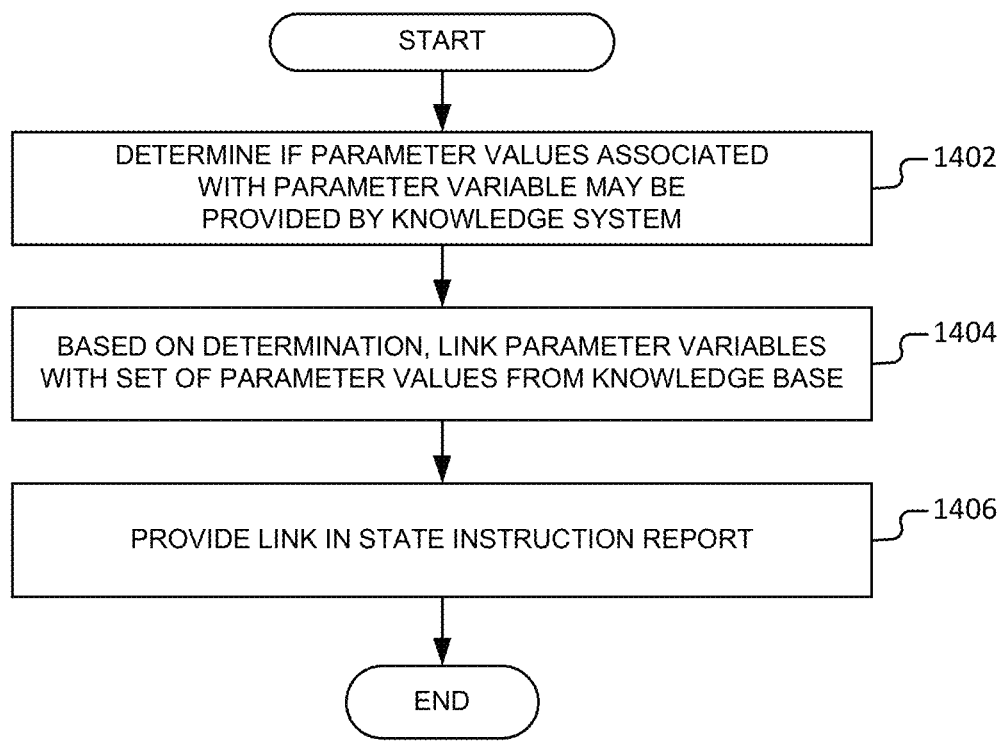
FIG. 14 is a flowchart of an example method for linking parameter values with parameter variables.

FIG. 14 is a flowchart of an example method for linking parameter values with parameter variables. In step 1402, the parameter discovery module 914 may determine if one or more parameter values associated with a parameter variable may be provided by the knowledge system 804. In various embodiments, the parameter discovery module 914 may identify any number of parameter values in the reviewable code that are associated with parameter variables. The static semantic module 916 may provide or receive semantic meaning associated with the parameter variables based on the parameter values as discussed herein. Further, the static semantic module 916 may associate categories (e.g., tags) with parameter variables.

In various embodiments, the parameter discovery module 914 may, based on the categories, determine if there are previously stored parameter values that may be associated with the parameter variables. For example, if the parameter variables are variables for referring to zip codes, the parameter discovery module 914 may determine that the knowledge system 804 has a set of zip codes that may be parameter values for the parameter variable. It will be appreciated that any number of parameter values may be associated with any number of parameter variables. Similarly, parameter values from any source (e.g., data store, remote server, another local application, or the like) may be associated with parameter variables.

In step 1404, the parameter discovery module 914 may link parameter variables with any number of a set of parameter values from the knowledge system 804. For example, once the parameter discovery module 914 determines a set of parameter values from the knowledge system 804 may be associated with a parameter variable in a state access instruction, the parameter discovery module 914 may modify the state access instruction or provide additional information to allow the parameter values in the knowledge system 804 to be used when changing the state of the application. It will be appreciated that any number of parameter values from different sources may be linked with any number of parameter variables.

In step 1406, the parameter discovery module 914 may include the modified state access instruction in the state instruction report and/or in any memory (e.g., knowledge system 804).

Figure 15:
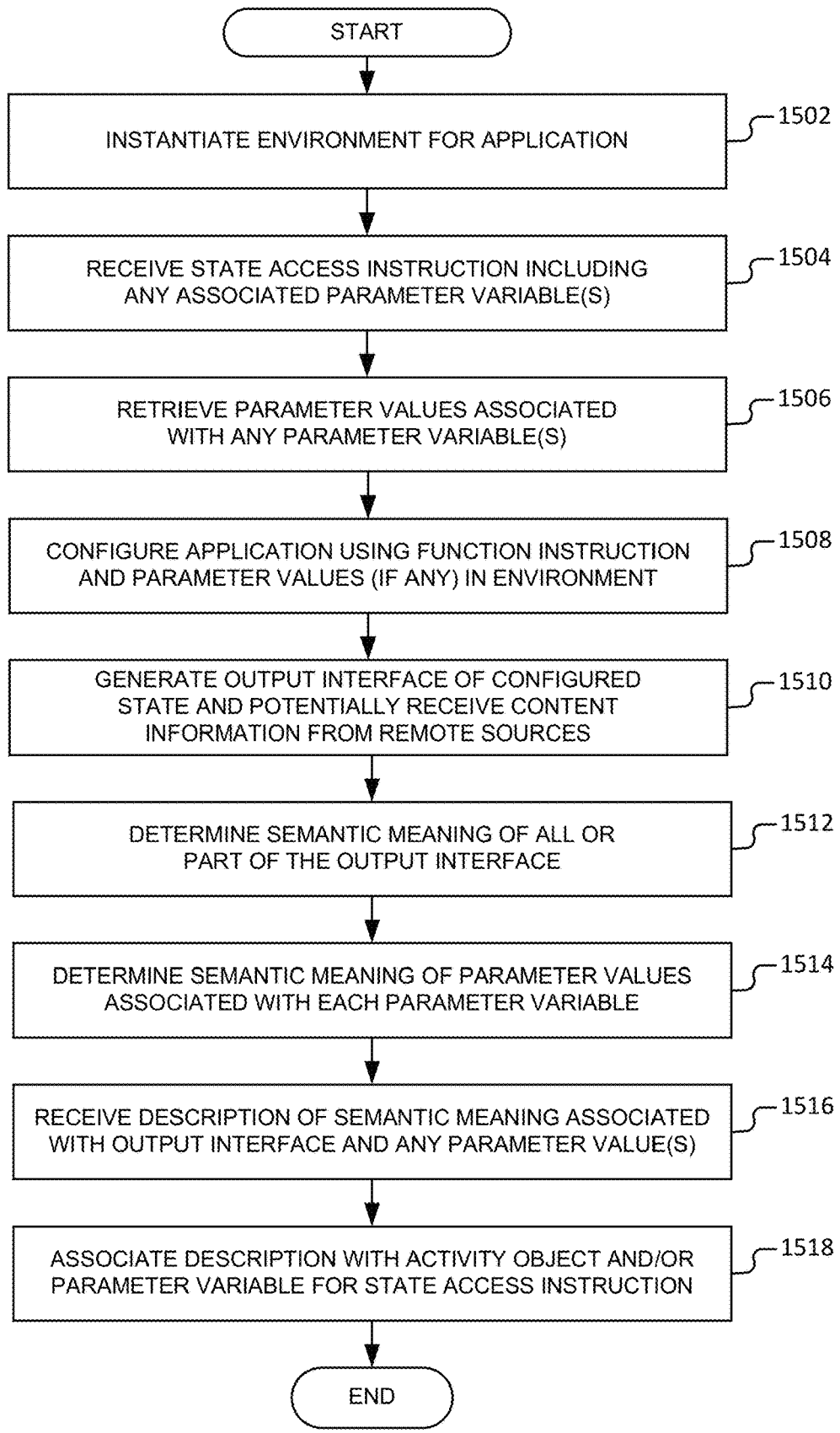
FIG. 15 is a flowchart of an example method for discovering states of an application in a dynamic environment.

FIG. 15 is a flowchart of an example method for discovering states of an application in a dynamic environment. In step 1502, the environment module 924 may instantiate an environment for the application. For example, the environment module 924 may instantiate an emulated environment or a virtualization.

In step 1504, the environment module 924 and/or the state configuration module 926 may receive a state access instruction including references to activity objects and any associated parameter variables. In some embodiments, the state configuration module 926 may select state access instructions from a state access instruction report. The state access instruction and/or state access instruction report may be provided to the state configuration module 926 in any number of ways.

In step 1506, the state configuration module 926 may retrieve parameter values associated with any parameter variables. The state access instruction received by the state configuration module 926 may include one or more parameter values rather than parameter variables. In some embodiments, the state access instruction may include a parameter variable with a link that is associated with parameter values contained in the knowledge system 804 or any source. The state configuration module 926 may retrieve any number of parameter values based on the link.

In step 1508, the state configuration module 926 configures the application in the environment using the state access instruction and any linked parameter values associated with the state access instruction to generate an output interface. For example, the state configuration module 926 may control and configure the application in the environment using the state access instruction and any linked parameter values.

Once the application is configured by the state configuration module 926, the application may generate an output interface in step 1510. The output interface may correspond to the state and may include UI elements and/or content. In various embodiments, the output interface may include information generated by application or retrieved from an external source (e.g., application server 806-1 or locally). It will be appreciated that inspection of the application code (e.g., the reviewable code of the application) may not indicate or suggest the information that may be received (e.g., downloaded) from other sources. As a result, in some embodiments, the dynamic discovery module 904 may configure the application in an environment to generate/receive information from those sources to allow for semantic meaning and description of functions and parameter values.

In various embodiments, the state configuration module 926 may identify steps taken by the application while executing in the environment to reach an application state. In one example, the steps taken by the application may be or may indicate steps a user may take in navigating the application to the application state. The state configuration module 926 may generate path instructions based on the identified steps.

In step 1512, the dynamic semantic module 932 may determine semantic meaning of all or part of the output interface. A user, the dynamic semantic module 932, and/or machine learning module may recognize the content generated or provided by all or part of the output interface. The user, the dynamic semantic module 932, and/or machine learning module may determine and/or characterize the content, layout, functionality, and/or the like of an output interface generated by the application.

In step 1514, the dynamic semantic module 932 may determine semantic meaning of parameter values associated with each parameter variable used to configure an application to an application state. For example, the user, the dynamic semantic module 932, and/or machine learning module may recognize semantic meaning from a UI element requesting information to be used as a parameter variable (e.g., a field request for information). In another example, the user, the dynamic semantic module 932, and/or machine learning module may recognize semantic meaning of parameter variables from the output interface (e.g., requesting an area code), semantic meaning of activity objects (e.g., based on the output of the state associated with an activity object), and output of the state.

In step 1516, the dynamic semantic module 932 may receive description (e.g., text, categories, tags, or the like) that describe the semantic meaning associated with output interface and any parameter value(s) and/or parameter variables. The description may be provided by any source including, but not limited to, the user, the dynamic semantic module 932, and/or machine learning module.

In step 1518, the dynamic semantic module 932 may associate the description with the activity object and/or parameter variables of the state access instructions and/or state access instruction report. In various embodiments, the dynamic semantic module 932 may provide the description and the associated state access instruction to the knowledge system 804. In some embodiments, a user may provide a query. The knowledge system 804 or a search system may identify the state access instruction using the information from the query and the description. The description may be used in any number of ways.

In some embodiments, the state access instruction may include a subset of parameter values (e.g., discovered from static analysis of the reviewable code). The dynamic discovery module 904 may configure an application in an emulation environment using the state access instruction and any number of the values from the subset to generate an output interface. The dynamic semantic module 932, based on the output interface and/or any of the subset of parameter values, may allow for the determination of semantic meaning of the parameter variable(s).

In some embodiments, semantic meaning determined by the static discovery module 902 may be improved. For example, the static discovery module 902 may identify a preliminary semantic meaning of an activity object and/or parameter variables based on inspection of the reviewable code. The dynamic discovery module 904, by configuring an application to a particular state and generating the output interface related to that state, may provide an improved understanding of the activity object and/or parameter variables (e.g., from an administrator and/or the dynamic semantic module) thereby allowing for improved or additional semantic meaning. As a result, additional categorization and/or descriptions may be applied or associated with the related state access instruction.

Further, the dynamic discovery module 904 may store and/or provide path instructions identified and/or created by the state configuration module 926 to any application or digital device (e.g., as a part of the state access instruction report and/or a path instruction report).

Figure 16:
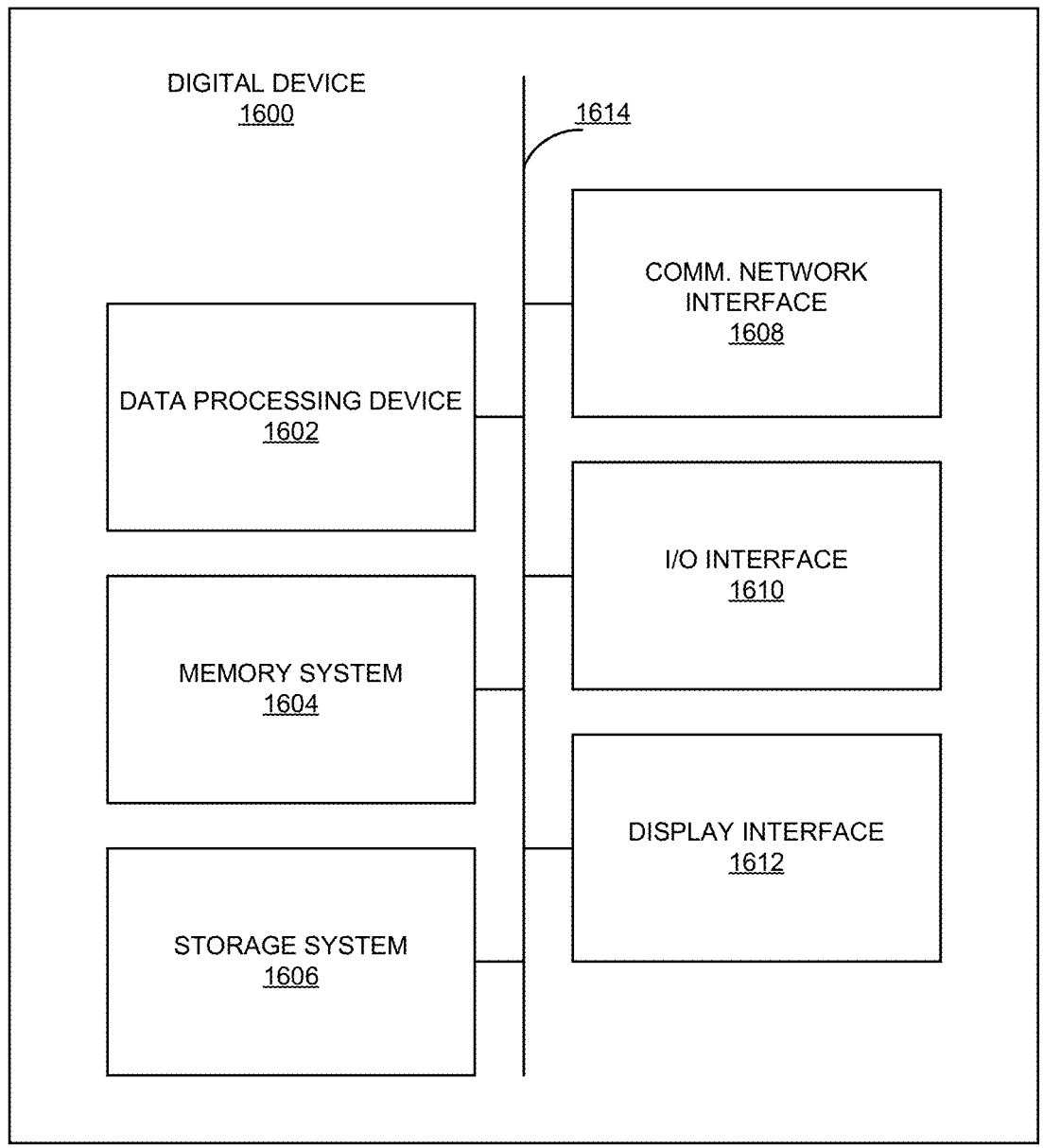
FIG. 16 is a block diagram of an example digital device.

FIG. 16 is a block diagram of an example digital device 1600. The digital device 1600 comprises a processor 1602, a memory system 1604, a storage system 1606, a communication network interface 1608, an I/O interface 1610, and a display interface 1612 communicatively coupled to a bus 1614. The processor 1602 is configured to execute executable instructions (e.g., programs). In some embodiments, the processor 1602 comprises circuitry or any processor capable of processing the executable instructions.

The memory system 1604 is any memory configured to store data. Some examples of the memory system 1604 are storage devices, such as RAM or ROM. The memory system 1604 may comprise the cache memory. In various embodiments, data is stored within the memory system 1604. The data within the memory system 1604 may be cleared or ultimately transferred to the storage system 1606.

The storage system 1606 is any storage configured to retrieve and store data. Some examples of the storage system 1606 are flash drives, hard drives, optical drives, and/or magnetic tape. The storage system 1606 may comprise non-transitory media. In some embodiments, the digital device 1600 includes a memory system 1604 in the form of RAM and a storage system 1606 in the form of flash data. Both the memory system 1604 and the storage system 1606 comprise computer readable media which may store instructions or programs that are executable by a computer processor including the processor 1602.

The communication network interface (com. network interface) 1608 may be coupled to a network (e.g., network 108) via the link 1614. The communication network interface 1608 may support communication over an Ethernet connection, a serial connection, a parallel connection, or an ATA connection, for example. The communication network interface 1608 may also support wireless communication (e.g., 802.11 a/b/g/n, WiMax). It will be apparent to that the communication network interface 1608 may support many wired and wireless standards.

The optional input/output (I/O) interface 1610 is any device that receives input from the user and output data. The optional display interface 1612 is any device that is configured to output graphics and data to a display. In one example, the display interface 1612 is a graphics adapter. It will be appreciated that not all digital devices 1600 comprise either the I/O interface 1610 or the display interface 1612.

The hardware elements of the digital device 1600 are not limited to those depicted in FIG. 16. A digital device 1600 may comprise more or less hardware elements than those depicted. Further, hardware elements may share functionality and still be within various embodiments described herein. In one example, encoding and/or decoding may be performed by the processor 1602 and/or a co-processor, such as a processor located on a graphics processing unit (GPU).

The above-described functions and components may be comprised of instructions that are stored on a storage medium such as a computer readable medium (e.g., a non-transitory computer readable medium). The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention.

The present invention is described above with reference to example embodiments. Various modifications may be made and other embodiments may be used without departing from the broader scope of the present invention. Therefore, these and other variations upon the example embodiments are intended to be covered by the present invention.

The invention claimed is:

1. A method comprising:
   executing, by a digital device, a first application, the executing of the first application including transmitting a search query and displaying a link for a first state of a second application corresponding to the search query, wherein the second application is installed on the digital device and is executable by the digital device;
   receiving, by the digital device, a user input selecting the link for the first state of the second application;
   in response to receiving the user input selecting the link, identifying, by the digital device, whether the first state of the second application is externally accessible for direct invoking based on information received in response to transmitting the search query; and
   based on a result of the digital device identifying whether the first state of the second application which is installed on the digital device is externally accessible, performing one of retrieving, by the digital device, state access instructions configured to invoke the first state of the second application and invoking the first state of the second application using the state access instructions or retrieving, by the digital device, a set of path instructions indicating a series of steps to navigate the second application to the first state of the second application and navigating, by the digital device, the second application to the first state using the set of path instructions.

2. The method of claim 1, further comprising:
   in response to transmitting the search query, receiving an accessibility indicator,
   wherein the accessibility indicator indicates whether the first state of the second application is externally inaccessible.

3. The method of claim 1, further comprising, in response to the digital device identifying that the first state of the second application is externally inaccessible, identifying whether privileges are available to allow configuration of the first application to invoke the first state using the state access instructions, the state access instructions being configured to invoke the first state of the second application without navigating the second application using the set of path instructions.

4. The method of claim 3, further comprising, in response to identifying that privileges are not available to allow configuration of the first application to invoke the first state of the second application using the state access instructions, providing the set of path instructions to an accessibility module of the digital device.

5. The method of claim 1,
   wherein the executing of the first application further includes displaying a second link for a second state of a third application,
   wherein the third application is installed on the digital device and is executable by the digital device, and
   wherein the method further comprises:

receiving a selection of the second link for the second state of the third application, in response to receiving the selection of the second link, identifying whether the second state of the third application is externally inaccessible for direct invoking, and in response to the second state of the third application being externally inaccessible, receiving the state access instructions configured to invoke the second state of the third application and configuring the third application using the state access instructions to invoke the second state of the third application.

6. The method of claim 1, wherein the executing of the first application further includes displaying a second link for a second state of a third application, wherein the third application is installed on the digital device and is executable by the digital device, and wherein the method further comprises:

receiving a selection of the second link for the second state of the third application, identifying whether the second state of the third application is externally inaccessible for direct invoking, identifying whether privileges are available to allow configuration of the third application to invoke the second state using the state access instructions, the state access instructions being configured to invoke the second state of the third application without navigating the third application, and in response to the privileges being available to allow configuration of the third application to invoke the second state of the third application using the state access instructions, receiving the state access instructions configured to invoke the second state of the third application and configuring the third application using the state access instructions to invoke the second state of the third application.

7. The method of claim 6, further comprising providing credential information to an operating system of the digital device to enable privilege access to allow or assist in allowing configuration of the third application to invoke the second state of the third application using the state access instructions.

8. The method of claim 1, wherein the link for the first state of the second application is selected from search results displayed, at least in part, on the digital device in response to the search query.

9. The method of claim 1, wherein the information includes at least one of an accessibility indicator corresponding to the selected link, the accessibility indicator indicating whether the selected link is externally accessible or externally inaccessible, information indicating whether a configuration of a native applicant of a native application in the digital device is successful, information on a custom background process running on the digital device that has been granted privileges, authorization data including a key or digital signature to authorize the second application, credentials to allow use of the second application, or a list of authorized applications.

10. The method of claim 1, wherein the digital device identifies that the first state of the second application is externally accessible by identifying that the second application can invoke the first state using at least one intent from a publicly available manifest.

11. A digital device comprising:

a processor; and a memory system, the processor being configured to execute instructions from the memory system, the instructions causing the processor to:

in response to transmitting a search query in a first application executed on the digital device, display a link for a first state of a second application, wherein the second application is installed on the digital device and is executable by the digital device, receive a user input selecting the link for the first state of a second application, in response to receiving the user input selecting the link, identify whether the first state of the second application is externally accessible for direct invoking based on information received in response to transmitting the search query, and based on a result of the identifying of whether the first state of the second application which is installed on the digital device is externally accessible, perform one of retrieve state access instructions configured to invoke the first state of the second application and invoke the first state of the second application using the state access instructions, or retrieve a set of path instructions indicating a series of steps to navigate the second application to the first state and navigate the second application to the first state using the set of path instructions.

12. The digital device of claim 11, wherein the instructions further cause the processor to, in response to transmitting the search query, receive an accessibility indictor and identify whether the first state of the second application is externally accessible for direct invoking based on the accessibility indicator, and wherein the accessibility indicator indicates whether the first state of the second application is externally inaccessible.

13. The digital device of claim 11, wherein the instructions further cause the processor to identify whether to retrieve the set of path instructions based on an identification that the first state of the second application is externally inaccessible.

14. The digital device of claim 11, wherein the instructions further cause the processor to, in response to identifying that the first state of the second application is externally inaccessible, identify whether privileges are available to allow configuration of the second application to invoke the first state of the second application using the state access instructions, the state access instructions being configured to invoke the first state of the second application without navigating the second application using the set of path instructions.

15. The digital device of claim 14, wherein the instructions further cause the processor to identify whether to retrieve the set of path instructions based on an identification that privileges are not available to allow configuration of the second application to invoke the first state using the state access instructions.

16. The digital device of claim 11, wherein the instructions further cause the processor to:

receive a selection of a second link for a second state of a third application, wherein the third application is installed on the digital device and is executable by the digital device, in response to receiving the selection of the second link, identify whether the second state of the third application is externally inaccessible for direct invoking, and in response to the second state of the third application being externally inaccessible, receive the state access instructions configured to invoke the second state of the third application and configure the third application using the state access instructions to invoke the second state of the third application.

17. The digital device of claim 11, wherein the instructions further cause the processor to:
receive a selection of a second link for a second state of a third application, wherein the third application is installed on the digital device and is executable by the digital device,
in response to receiving the selection of the second link, identify whether the second state of the third application is externally inaccessible for direct invoking,
identify whether privileges are available to allow configuration of the third application to invoke the second state using the state access instructions, the state access instructions being configured to invoke the second state of the third application without navigating the third application, and
in response to the privileges being available to allow configuration of the third application to invoke the second state of the third application using the state access instructions, receive the state access instructions configured to invoke the second state of the third application and configure the third application using the state access instructions to invoke the second state.

18. The digital device of claim 17, wherein the instructions further cause the processor to provide credential information to an operating system of the digital device to enable privilege access to allow or assist in allowing configuration of the third application to invoke the second state of the third application using the state access instructions.

19. The digital device of claim 11, wherein the first application comprises a search application configured to:

display search results on the digital device in response to the search query, and
receive the user input selecting the link for the first state of the second application.

20. A non-transitory computer readable medium comprising executable instructions, the instructions being executable by a data processing device to perform a method, the method comprising:
executing, by a digital device, a first application, the executing of the first application including transmitting a search query and displaying a link for a first state of a second application corresponding to the search query, wherein the second application is installed on the digital device and is executable by the digital device;
receiving, by the digital device, a user input selecting the link for the first state of the second application;
in response to receiving the user input selecting the link, identifying, by the digital device, whether the first state of the second application is externally accessible for direct invoking based on information received in response to transmitting the search query; and
based on a result of the digital device identifying whether the first state of the second application which is installed on the digital device is externally accessible, performing one of retrieving, by the digital device, state access instructions configured to invoke the first state of the second application and invoking the first state of the second application using the state access instructions or retrieving, by the digital device, a set of path instructions indicating a series of steps to navigate the second application to the first state of the second application and navigating, by the digital device, the second application to the first state using the set of path instructions.

* * * * *